US010807594B2

(12) United States Patent
Hatano

(10) Patent No.: US 10,807,594 B2
(45) Date of Patent: Oct. 20, 2020

(54) VEHICLE CONTROL DEVICE, VEHICLE CONTROL METHOD, AND VEHICLE CONTROL PROGRAM

(71) Applicant: HONDA MOTOR CO., LTD., Minato-ku, Tokyo (JP)

(72) Inventor: Kunimichi Hatano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/080,784

(22) PCT Filed: Mar. 7, 2016

(86) PCT No.: PCT/JP2016/056969
§ 371 (c)(1),
(2) Date: Aug. 29, 2018

(87) PCT Pub. No.: WO2017/154070
PCT Pub. Date: Sep. 14, 2017

(65) Prior Publication Data
US 2019/0061745 A1    Feb. 28, 2019

(51) Int. Cl.
*B60W 30/09*    (2012.01)
*B60W 20/15*    (2016.01)
(Continued)

(52) U.S. Cl.
CPC .......... *B60W 30/09* (2013.01); *B60W 10/20* (2013.01); *B60W 20/15* (2016.01); *B60W 30/12* (2013.01);
(Continued)

(58) Field of Classification Search
CPC .. B60W 10/20; B60W 20/15; B60W 2420/42; B60W 2420/52; B60W 2550/10;
(Continued)

(56) References Cited

U.S. PATENT DOCUMENTS 5,530,651 A * 6/1996 Uemura ................. G01S 15/86
                                                              701/301
6,825,756 B2 * 11/2004 Bai ........................ G01S 13/931
                                                              340/435
(Continued)

FOREIGN PATENT DOCUMENTS

JP    2000-344067    12/2000
JP    2006-168629    6/2006
(Continued)

OTHER PUBLICATIONS

International Search Report and Written Opinion for International Patent Application No. PCT/JP2016/056969 dated May 24, 2016, 8 pages.
(Continued)

*Primary Examiner* — Babar Sarwar
(74) *Attorney, Agent, or Firm* — Amin, Turocy & Watson, LLP

(57) ABSTRACT

A vehicle control device includes: an automatic driving control unit performing automatic driving control of automatically controlling one or both of acceleration/deceleration and steering of a subject vehicle such that the subject vehicle runs along a route to a destination; an avoidance target object detecting unit detecting an avoidance target object that is a target object to be avoided in the vicinity of the subject vehicle; and an avoidance control unit performing an avoidance operation by executing avoidance control of automatically controlling one or both of the acceleration/deceleration and the steering of the subject vehicle with a priority with respect to the automatic driving control in a case in which approach of the subject vehicle to the detected avoidance target object within a predetermined range is detected, and the automatic driving control unit ends the
(Continued)

automatic driving control in a case in which the avoidance operation is executed.

11 Claims, 11 Drawing Sheets

(51) Int. Cl.
*B60W 10/20* (2006.01)
*B60W 30/12* (2020.01)
*B60W 30/16* (2020.01)
*B60W 50/14* (2020.01)
*G08G 1/16* (2006.01)

(52) U.S. Cl.
CPC ............ *B60W 30/16* (2013.01); *B60W 50/14* (2013.01); *B60W 2420/42* (2013.01); *B60W 2420/52* (2013.01); *B60W 2554/00* (2020.02); *G08G 1/167* (2013.01)

(58) Field of Classification Search
CPC ...... B60W 30/09; B60W 30/12; B60W 30/16; B60W 50/14; G08G 1/167
See application file for complete search history.

(56) References Cited

U.S. PATENT DOCUMENTS

| | | | | |
|---|---|---|---|---|
| 7,395,144 | B2* | 7/2008 | Isaji | B60T 7/22 180/170 |
| 7,983,828 | B2* | 7/2011 | Ezoe | B60T 13/662 701/78 |
| 8,244,458 | B1* | 8/2012 | Blackburn | G08G 1/166 701/301 |
| 8,532,901 | B2* | 9/2013 | Nitz | B60T 7/22 701/70 |
| 8,736,483 | B2* | 5/2014 | Takeuchi | G08G 1/166 342/71 |
| 2001/0003810 | A1* | 6/2001 | Shinmura | B60T 8/17558 701/301 |
| 2002/0184236 | A1* | 12/2002 | Donath | G01C 21/26 |
| 2004/0030499 | A1* | 2/2004 | Knoop | B60K 31/0008 701/301 |
| 2007/0005609 | A1* | 1/2007 | Breed | B60N 2/2863 |
| 2009/0043440 | A1* | 2/2009 | Matsukawa | G05D 1/0214 701/25 |
| 2009/0088925 | A1* | 4/2009 | Sugawara | B60W 30/12 701/41 |
| 2009/0150034 | A1* | 6/2009 | Ezoe | B60T 7/22 701/53 |
| 2010/0076676 | A1* | 3/2010 | Machino | G01C 21/3461 701/413 |
| 2010/0134263 | A1* | 6/2010 | Mathony | G08G 1/161 340/435 |
| 2010/0253493 | A1* | 10/2010 | Szczerba | G01S 13/723 340/435 |
| 2012/0235853 | A1* | 9/2012 | Takeuchi | B60W 30/18154 342/71 |
| 2012/0239265 | A1* | 9/2012 | Kato | B60W 50/087 701/70 |
| 2013/0218396 | A1* | 8/2013 | Moshchuk | G08G 1/165 701/25 |
| 2014/0229069 | A1* | 8/2014 | Akiyama | B60W 10/18 701/41 |
| 2016/0059853 | A1* | 3/2016 | Yamakoshi | B60W 10/18 701/36 |
| 2016/0327947 | A1* | 11/2016 | Ishikawa | B60W 50/14 |
| 2016/0335892 | A1* | 11/2016 | Okada | B60W 30/0956 |
| 2017/0053534 | A1* | 2/2017 | Lokesh | H04L 67/12 |
| 2017/0313297 | A1* | 11/2017 | Okada | B60W 10/18 |
| 2017/0313325 | A1* | 11/2017 | Asakura | B60W 50/12 |
| 2018/0268702 | A1* | 9/2018 | Morotomi | G08G 1/165 |
| 2019/0039626 | A1* | 2/2019 | Hatano | B60W 30/14 |
| 2019/0113914 | A1* | 4/2019 | Abe | B60W 30/10 |
| 2019/0317217 | A1* | 10/2019 | Day | G01S 7/026 |

FOREIGN PATENT DOCUMENTS

| | | |
|---|---|---|
| JP | 2007-210591 | 8/2007 |
| JP | 2008-132867 | 6/2008 |
| JP | 2009-026321 | 2/2009 |
| JP | 2012-192776 | 10/2012 |
| JP | 2013-129328 | 7/2013 |
| JP | 2015-077936 | 4/2015 |
| JP | 2015-185085 | 10/2015 |
| JP | 2015-230552 | 12/2015 |
| JP | 2016-028927 | 3/2016 |
| WO | 2013-046301 | 4/2013 |
| WO | 2015-056394 | 4/2015 |
| WO | 2016/017636 | 2/2016 |

OTHER PUBLICATIONS

Japanese Office Action for Japanese Patent Application No. 2018-503864 dated Dec. 3, 2019.

* cited by examiner

VEHICLE CONTROL DEVICE, VEHICLE CONTROL METHOD, AND VEHICLE CONTROL PROGRAM

TECHNICAL FIELD

The present invention relates to a vehicle control device, a vehicle control method, and a vehicle control program.

BACKGROUND ART

In recent years, research on technologies for automatically controlling at least one of the acceleration/deceleration and the steering of a subject vehicle such that the subject vehicle runs along a route to a destination (hereinafter, referred to as automatic driving control) have progressed. In a case in which an unexpected event occurs for a running vehicle, it is necessary to perform control such that the unexpected event is appropriately avoided. In connection with this, a technology for stopping a running subject vehicle using automatic driving control at the time of the occurrence of a malfunction of a control system of a vehicle has been disclosed (for example, see Patent Literature 1).

CITATION LIST

Patent Literature

[Patent Literature 1]
Japanese Unexamined Patent Application, First Publication No. 2000-344067

SUMMARY OF INVENTION

Technical Problem

However, in the technology disclosed in Patent Literature 1, occurrences of unexpected events such as a case in which an avoidance target object that may be an obstacle for the advancement of a vehicle is present in an advancement direction or the like of a running vehicle and the like have not been sufficiently reviewed.

The present invention is in view of such situations, and one object thereof is to provide a vehicle control device, a vehicle control method, and a vehicle control program capable of appropriately avoiding an unexpected event that may be an obstacle for the advancement of a vehicle.

Solution to Problem (1) An aspect according to the present application is a vehicle control device including: an automatic driving control unit configured to perform automatic driving control of automatically controlling one or both of acceleration/deceleration and steering of a subject vehicle such that the subject vehicle runs along a route to a destination; an avoidance target object detecting unit configured to detect an avoidance target object that is a target object to be avoided in the vicinity of the subject vehicle; and an avoidance control unit configured to perform an avoidance operation by executing avoidance control of automatically controlling one or both of the acceleration/deceleration and the steering of the subject vehicle with a priority with respect to the automatic driving control in a case in which approach of the subject vehicle to the detected avoidance target object within a predetermined range is detected, in which the automatic driving control unit ends the automatic driving control in a case in which the avoidance operation is executed.

(2) In the above (1), the vehicle control device may further include a notification unit configured to perform a visible, audible, or tactile notification operation for an occupant of the subject vehicle before the avoidance operation is executed, in which the automatic driving control unit ends the automatic driving control while a notification operation using the notification unit is performed or when the notification operation ends.

(3) In the above (1) or (2), in a case in which the avoidance operation is released or ended after the automatic driving control ends, the automatic driving control unit may restart the automatic driving control.

(4) In any one of the above (1) to (3), in a case in which a speed of the subject vehicle for the avoidance target object exceeds a predetermined value, the avoidance control unit may control at least the steering of the subject vehicle with a priority with respect to steering using the automatic driving control unit on the basis of a result of recognition of the vicinity of the subject vehicle.

(5) In the above (4), the predetermined value may be a lower limit value of the speed for which it is determined that avoidance is achievable by changing an advancement direction using the steering rather than decelerating the subject vehicle.

(6) In the above (4) or (5), in a case in which the speed exceeds the predetermined value and the avoidance target object is present at a distance a (7) In any one of the above (1) to (6), t which an avoidance operation is executable using steering, the avoidance control unit may control at least the steering of the subject vehicle with a priority with respect to the steering using the automatic driving control unit.

(7) In any one of the above (1) to (6), in a case in which a distance to the avoidance target object is a distance, for which deceleration is achievable using deceleration of a predetermined value or less, or more, the avoidance control unit that avoidance is achievable by decelerating the subject vehicle.

(8) In the above (7), the avoidance control unit may avoid the avoidance target object by decelerating the subject vehicle in a case in which the distance to the avoidance target object increases in accordance with an increase in the relative speed and is a reference distance, which is set in accordance with a trend in which a rate of change of the distance increases in accordance with an increase in the relative speed, or more.

(9) In the above (8), the avoidance control unit may avoid the avoidance target object using steering in a case in which the distance is longer than the reference distance linearly increasing in accordance with an increase in the relative speed.

(10) In any one of the above (7) to (9), the avoidance control unit may determine that avoidance is achievable using the steering in a case in which the distance is a distance for which deceleration using a yaw rate of a predetermined value or less is achievable.

(11) In any one of the above (1) to (10), the avoidance control unit may control the steering of the subject vehicle in a case in which a distance for which avoidance is achievable by decelerating the subject vehicle is longer than a distance for which avoidance is achievable using the steering.

(12) An aspect according to the present application is a vehicle control method using an in-vehicle computer. The vehicle control method includes: performing automatic driving control of automatically controlling one or both of acceleration/deceleration and steering of a subject vehicle such that the subject vehicle runs along a route to a destination; detecting an avoidance target object that is a target object to be avoided in the vicinity of the subject vehicle and performing an avoidance operation by executing avoidance control of automatically controlling one or both of the acceleration/deceleration and the steering of the subject vehicle with a priority with respect to the automatic driving control in a case in which approach of the subject vehicle to the detected avoidance target object within a predetermined range is detected; and ending the automatic driving control in a case in which the avoidance operation is executed.

(13) An aspect according to the present application is a non-transitory computer-readable recording medium storing a vehicle control program causing an in-vehicle computer to execute: performing automatic driving control of automatically controlling one or both of acceleration/deceleration and steering of a subject vehicle such that the subject vehicle runs along a route to a destination; detecting an avoidance target object that is a target object to be avoided in the vicinity of the subject vehicle and performing an avoidance operation by executing avoidance control of automatically controlling one or both of the acceleration/deceleration and the steering of the subject vehicle with a priority with respect to the automatic driving control in a case in which approach of the subject vehicle to the detected avoidance target object within a predetermined range is detected; and ending the automatic driving control in a case in which the avoidance operation is executed.

Advantageous Effects of Invention

According to the aspects according to the present application, control can be performed such that an unexpected event that may be an obstacle for the advancement of a vehicle is appropriately avoided.

DESCRIPTION OF EMBODIMENTS

Hereinafter, a vehicle control device, a vehicle control method, and a vehicle control program according to embodiments of the present invention will be described with reference to the drawings.

Common Configuration

Figure 1:
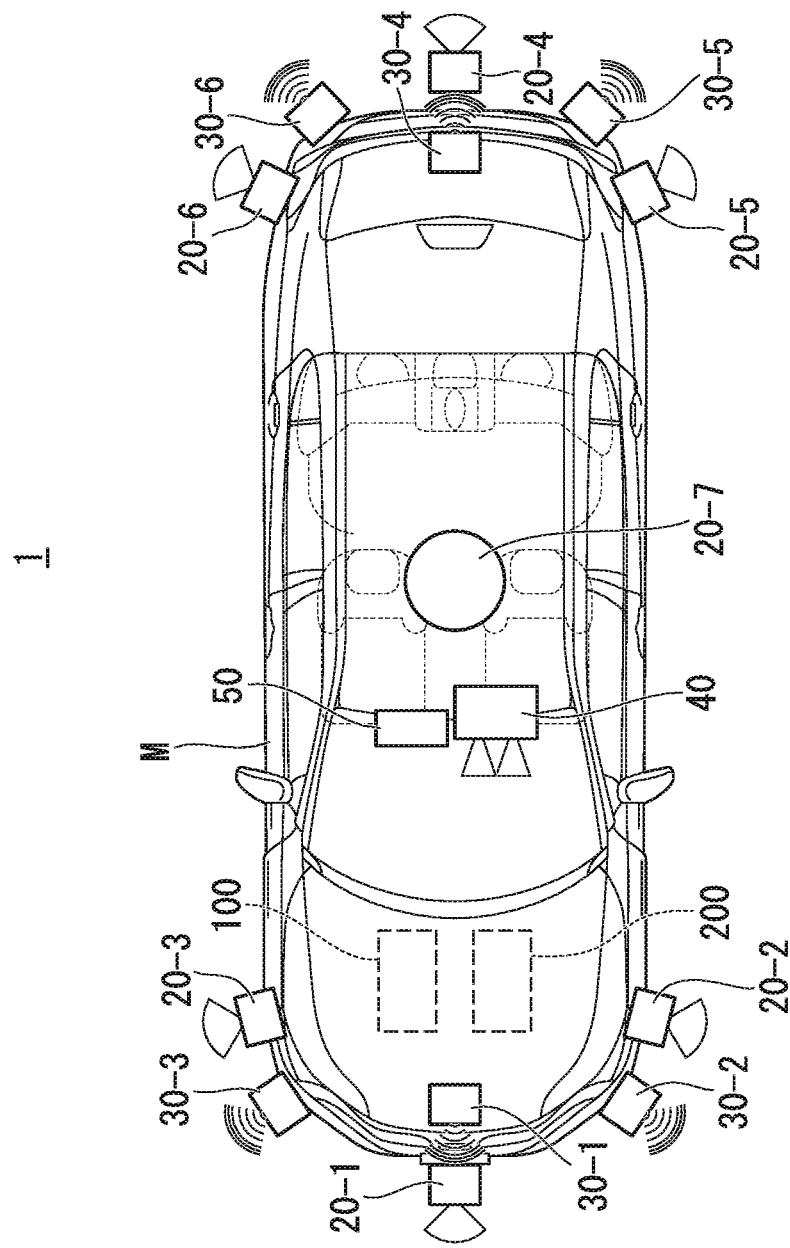
FIG. 1 is a diagram illustrating constituent elements included in a subject vehicle M according to a first embodiment.

FIG. 1 is a diagram illustrating constituent elements included in a vehicle (hereinafter, referred to as a subject vehicle M) in which a vehicle control device according to each embodiment is mounted. A vehicle in which the vehicle control device 1 is mounted, for example, is a vehicle of two wheels, three wheels, four wheels, or the like and includes an automobile having an internal combustion engine such as a diesel engine or a gasoline engine as its power source, an electric vehicle having a motor as its power source, a hybrid vehicle equipped with both an internal combustion engine and a motor, and the like. In addition, the electric vehicle described above, for example, is driven using electric power discharged by a cell such as a secondary cell, an alcohol fuel cell, a metal fuel cell, an alcohol fuel cell, or the like.

As illustrated in FIG. 1, sensors such as finders 20-1 to 20-7, radars 30-1 to 30-6, a camera 40 and the like, a navigation device 50, an automatic driving control device 100, and an unexpected event avoiding control device 200 are mounted in the subject vehicle M. Each of the finders 20-1 to 20-7 is a light detection and ranging or a laser imaging detection and ranging (LIDAR) device measuring a distance to a target by measuring scattered light from emitted light. For example, the finder 20-1 is mounted on a front grille or the like, and the finders 20-2 and 20-3 are mounted on side faces of a vehicle body, door mirrors, inside head lights, near side lights, or the like. The finder 20-4 is mounted in a trunk lid or the like, and the finders 20-5 and 20-6 are mounted on side faces of the vehicle body, inside tail lamps or the like. Each of the finders 20-1 to 20-6 described above, for example, has a detection area of about 150 degrees with respect to a horizontal direction. In addition, the finder 20-7 is mounted on a roof or the like. For example, the finder 20-7 has a detection area of 360 degrees with respect to a horizontal direction.

The radars 30-1 and 30-4 described above, for example, are long-distance millimeter wave radars having a wider detection area in a depth direction than that of the other radars. In addition, the radars 30-2, 30-3, 30-5, and 30-6 are middle-distance millimeter wave radars having a narrower detection area in a depth direction than that of the radars 30-1 and 30-4. Hereinafter, in a case in which the finders 20-1 to 20-7 are not particularly distinguished from each other, one thereof will be simply referred to as a "finder 20", and, in a case in which the radars 30-1 to 30-6 are not to be particularly distinguished from each other, one thereof will be simply referred to as a "radar 30." The radar 30, for example, detects an object using a frequency modulated continuous wave (FM-CW) system.

The camera 40, for example, is a digital camera using an individual imaging device such as a charge coupled device (CCD), a complementary metal oxide semiconductor (CMOS), or the like. The camera 40 is mounted in an upper part of a front window shield, a rear face of an interior mirror, or the like. The camera 40, for example, repeats imaging the side in front of the subject vehicle M periodically.

The configuration illustrated in FIG. 1 is merely one example, and part of the configuration may be omitted, and other different components may be added.

First Embodiment

Figure 2:
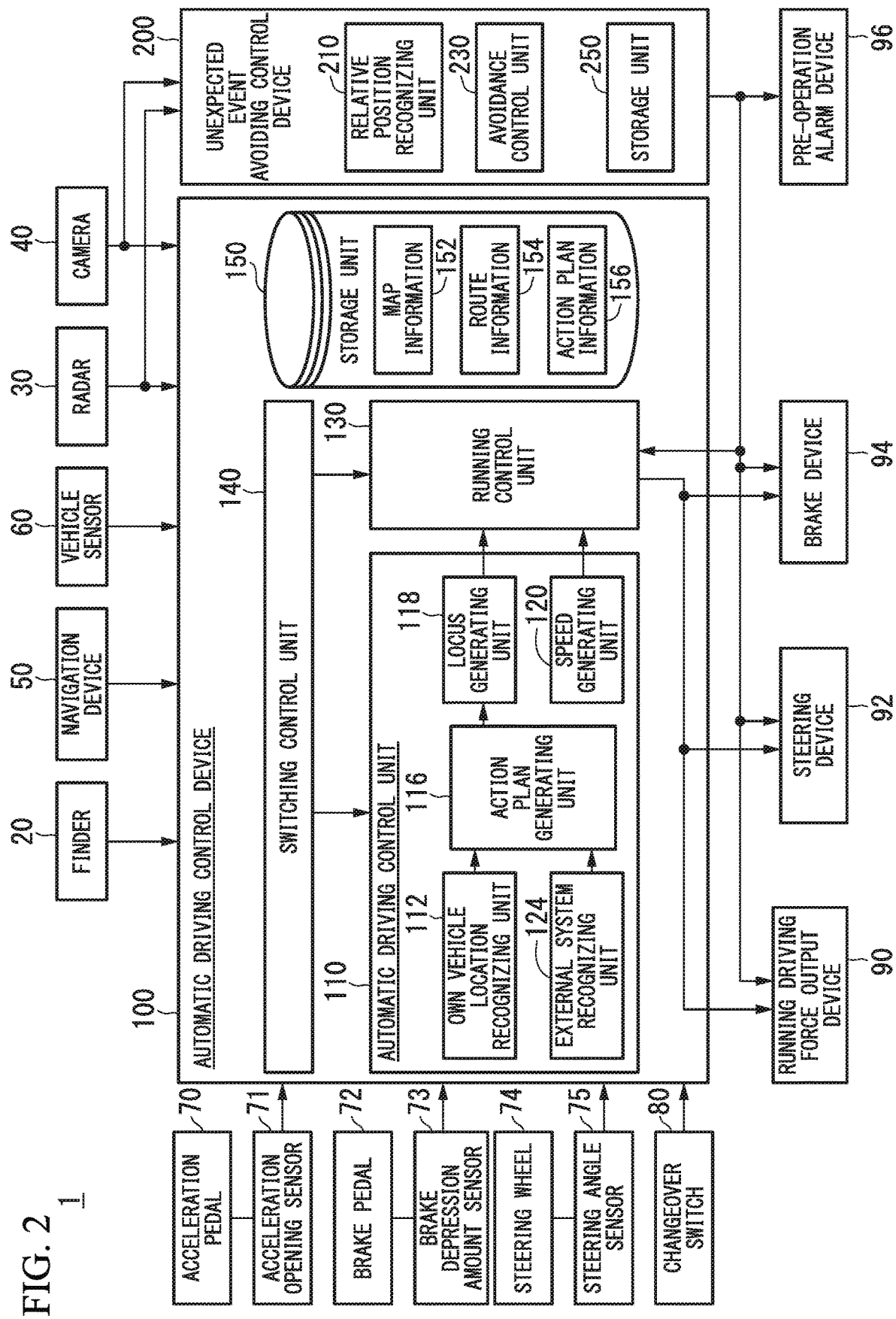
FIG. 2 is a functional configuration diagram of the subject vehicle M.

FIG. 2 is a functional configuration diagram of the subject vehicle M in which a vehicle control device 1 according to a first embodiment is mounted. In the subject vehicle M, in addition to the finders 20, the radars 30, and the camera 40, operation devices such as a navigation device 50, a vehicle sensor 60, an acceleration pedal 70, a brake pedal 72, a steering wheel 74, and the like, operation detecting sensors such as an acceleration opening sensor 71, a brake depression amount sensor (brake switch) 73, a steering angle sensor (or a steering torque sensor) 75, and the like, a changeover switch 80, a running driving force output device 90, a steering device 92, a brake device 94, a pre-operation alarm device 96 (notification unit), an automatic driving control device 100, and an unexpected event avoiding control device 200 are mounted. Such devices and units are interconnected through a multiple-communication line such as a controller area network (CAN), a serial communication line, a radio communication network, or the like. The operation devices illustrated as an example are merely examples, and a joystick, buttons, a dial switch, a graphic user interface (GUI) switch, or the like may be mounted in the subject vehicle M.

The navigation device 50 includes a global navigation satellite system (GNSS) receiver and map information (navigation map), a touch panel-type display device functioning as a user interface, a speaker, a microphone, and the like. The navigation device 50 identifies a location of the subject vehicle using the GNSS receiver and derives a route from the location to a destination designated by a user. The route derived by the navigation device 50 is stored in a storage unit 150 as route information 154. The location of the subject vehicle M may be specified or complemented by an inertial navigation system (INS) using an output of the vehicle sensor 60. In addition, when the automatic driving control device 100 operates in a manual drive mode, the navigation device 50 performs guidance using speech or a navigation display for a route to the destination. Components used for specifying the location of the subject vehicle M may be disposed to be independently from the navigation device 50. In addition, the navigation device 50, for example, may be realized by one function of a terminal device such as a smartphone, a tablet terminal, or the like held by a user. In such a case, information is transmitted and received using wireless or wired communication between the terminal device and the automatic driving control device 100.

The vehicle sensor 60 includes a vehicle speed sensor detecting a vehicle speed, an acceleration sensor detecting acceleration, a yaw rate sensor detecting an angular velocity around a vertical axis, an azimuth sensor detecting the azimuth of the subject vehicle M, and the like.

A display unit 62 displays information as an image. The display unit 62, for example, includes a liquid crystal display (LCD), an organic electroluminescence (EL) display device, or the like. In this embodiment, the display unit 62 will be described as a head-up display displaying an image within the field of view of a vehicle occupant by reflecting an image on a front window of the vehicle M. In addition, the display unit 62 may be a display unit included in the navigation device 50 or a display unit of an instrument panel displaying a state (a speed and the like) of the subject vehicle M. The speaker 64 outputs information as speech.

The operation detecting sensor outputs an accelerator opening degree, a brake depression amount, and a steering angle to the automatic driving control device 100 as results of detection. Instead of this, the results of detection acquired by the operation detecting sensors may be directly output to the running driving force output device 90, the steering device 92, or the brake device 94 depending on a drive mode.

The changeover switch 80 is a switch that is operated by a vehicle occupant. The changeover switch 80 receives an operation of a vehicle occupant, generates a drive mode designation signal designating a drive mode of the subject vehicle M, and outputs the generated drive mode designation signal to the switching control unit 140. The drive mode will be described later.

For example, the running driving force output device 90 includes an engine and an engine control unit (ECU) controlling the engine in a case in which the subject vehicle M is an automobile having an internal combustion engine as its power source, includes a running motor and a motor ECU controlling the running motor in a case in which the subject vehicle M is an electric vehicle having a motor as its power source, and includes an engine, an engine ECU, a running motor, and a motor ECU in a case in which the subject vehicle M is a hybrid vehicle. In a case in which the running driving force output device 90 includes only an engine, the engine ECU adjusts a throttle opening degree, a shift level, and the like of the engine in accordance with information input from a running control unit 130 to be described later and outputs a running driving force (torque) used for running the vehicle. On the other hand, in a case in which the running driving force output device 90 includes only a running motor, the motor ECU adjusts a duty ratio of a PWM signal given to the running motor in accordance with information input from the running control unit 130 and outputs the running driving force described above. In a case in which the running driving force output device 90 includes an engine and a running motor, both an engine ECU and a motor ECU control a running driving force in cooperation with each other in accordance with information input from the running control unit 130. In addition, in a case in which a control direction for decreasing a driving force is received from the unexpected event avoiding control device 200, the running driving force output device 90 decreases the driving force with a priority with respect to the control from the running control unit 130.

The steering device 92, for example, includes an electric motor. The electric motor, for example, changes the direction of a steering wheel by applying a force to a rack and pinion mechanism. The steering device 92 changes the direction of the steering wheel by driving the electric motor in accordance with information input from the running control unit 130. In addition, in a case in which a control direction is received from the unexpected event avoiding control device 200, the steering device 92 changes the direction of the steering wheel by driving the electric motor with a priority with respect to the control from the running control unit 130.

The brake device 94, for example, is an electric servo brake device including a brake caliper, a cylinder delivering hydraulic pressure to the brake caliper, an electric motor generating hydraulic pressure in the cylinder, and a brake control unit. The brake control unit of the electric servo brake device performs control of the electric motor in accordance with information input from the running control unit 130 such that brake torque according to a braking operation is output to each vehicle wheel. The electric servo brake device may include a mechanism delivering hydraulic pressure generated by an operation of the brake pedal to the cylinder through a master cylinder as a backup. In addition, the brake device 94 is not limited to the electric servo brake device described above and may be an electronic control-type hydraulic brake device. The electronic control-type hydraulic brake device delivers hydraulic pressure of the master cylinder to the cylinder by controlling an actuator in accordance with information input from the running control unit 130. In addition, the brake device 94 may include a regenerative brake using the running motor included in the running driving force output device 90. In addition, in a case in which a control direction is received from the unexpected event avoiding control device 200, the brake device 94 changes a braking force according to the electric servo brake device with a priority with respect to the control from the running control unit 130.

The pre-operation alarm device 96 receives a control direction from the unexpected event avoiding control device 200 and performs a visible, audible, or tactile notification operation for an occupant of the subject vehicle M before execution of an emergency avoidance operation. The emergency avoidance operation includes execution of automatic drive stopping control for stopping automatic driving control when an unexpected event occurs in accordance with detection of a target or execution of avoidance control of automatically controlling one or both of acceleration/deceleration and steering of the subject vehicle M. The pre-operation alarm device 96 notifies an occupant of the subject vehicle M of the execution of an emergency avoidance operation by performing the notification operation described above. For example, the pre-operation alarm device 96 includes some or all of a display device displaying a display for notifying an occupant of the subject vehicle M of the execution of an emergency avoidance operation, a vibration generating device generating a sound or a vibration used for notification of the execution of an emergency avoidance operation inside the subject vehicle M, a safety belt device drawing a safety belt by a predetermined amount before the execution of an emergency avoidance operation, and the like. In other words, the emergency avoidance operation is executed as unexpected event avoiding control preventing the occurrence of an unexpected event by avoiding a target using the unexpected event avoiding control device 200.

[Automatic Driving Control Device]

Hereinafter, the automatic driving control device 100 will be described. The automatic driving control device 100, for example, includes an automatic driving control unit 110, a running control unit 130, a switching control unit 140, and a storage unit 150. The automatic driving control unit 110, for example, includes a subject vehicle position recognizing unit 112, an external system recognizing unit 114, an action plan generating unit 116, a locus generating unit 118, and a speed generating unit 120. Each unit of the automatic driving control unit 110, the running control unit 130, and part or all of the switching control unit 140 are realized by executing a program using a processor such as a central processing unit (CPU) or the like. In addition, some or the whole thereof may be realized by hardware such as a large scale integration (LSI), an application specific integrated circuit (ASIC), or the like. Furthermore, the storage unit 150 is realized by a read only memory (ROM), a random access memory (RAM), a hard disk drive (HDD), a flash memory, or the like. A program executed by the processor may be stored in the storage unit 150 in advance or may be downloaded from an external device through in-vehicle internet facilities or the like. In addition, a program may be installed in the storage unit 150 by mounting a portable-type storage medium storing the program in a drive device not illustrated in the drawing. Furthermore, the automatic driving control device 100 may be distributed in a plurality of computer devices.

The automatic driving control unit 110, for example, performs control by performing switching between a drive mode A, a drive mode B, a drive mode C, and a drive mode D in accordance with a direction from the switching control unit 140.

The drive mode A is a drive mode in which acceleration/deceleration and steering of the subject vehicle M are automatically controlled.

The drive mode B is a drive mode in which the steering of the subject vehicle M is automatically controlled, and the acceleration/deceleration is controlled on the basis of an operation for an operation device such as the acceleration pedal 70, the brake pedal 72, or the like.

The drive mode C is a drive mode in which the acceleration/deceleration of the subject vehicle M is automatically controlled, and the steering is controlled on the basis of an operation for an operation device such as the steering wheel 74 or the like.

The drive mode D is a drive mode (manual drive mode) in which the acceleration/deceleration of the subject vehicle M is controlled on the basis of an operation for an operation device such as the acceleration pedal 70, the brake pedal 72, or the like, and the steering is controlled on the basis of an operation for an operation device such as the steering wheel 74 or the like.

When operation is in the drive mode D, there may be a configuration in which the operation of the automatic driving control unit 110 is stopped, and an input signal from the operation detecting sensor is supplied to the running control unit 130 or is directly supplied to the running driving force output device 90, the running driving force output device 92, and the brake device 94.

The degree of automatic driving is the highest in the drive mode A and is the lowest in the drive mode D. The degrees of automatic driving in the drive mode B and the drive mode C is between those of the drive mode A and the drive mode D.

The subject vehicle position recognizing unit 112 of the automatic driving control unit 110 recognizes a lane (running lane) in which the subject vehicle M is running and a relative position of the subject vehicle M with respect to the running lane on the basis of the map information 152 stored in the storage unit 150 and information input from the finder 20, the radar 30, the camera 40, the navigation device 50 or the vehicle sensor 60. The map information 152, for example, is map information having a higher accuracy than the navigation map included in the navigation device 50 and includes information of the center of lanes, information of boundaries of lanes, and the like. More specifically, in the map information 152, road information, traffic regulations information, address information (an address and a zip code), facilities information, telephone information, and the like are included. In the road information, information representing a type of road such as an expressway and a toll road, a local road, or a prefectural road and information such as the number of lanes of a road, a width of each lane, a gradient of a road, a location of a road (three-dimensional coordinates including a longitude, a latitude and a height), a curvature of the curve of a road, locations of merging and branching points of lanes, a sign installed on a road, and the like are included. In the traffic regulation information, information of closure of a lane due to a roadwork, a traffic accident, congestion, or the like is included.

Figure 3:
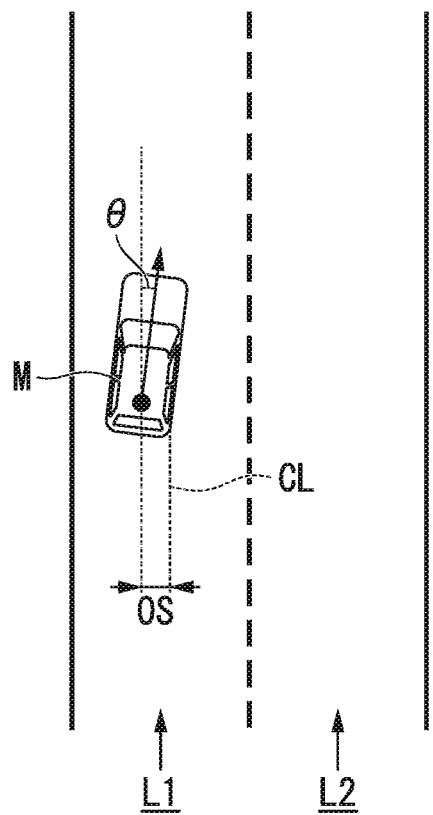
FIG. 3 is a diagram illustrating a view in which a relative position of the subject vehicle M with respect to a running lane L1 is recognized by a subject vehicle position recognizing unit 112.

FIG. 3 is a diagram illustrating a view in which a relative position of the vehicle M with respect to a running lane L1 is recognized by the subject vehicle position recognizing unit 112. The subject vehicle position recognizing unit 112, for example, recognizes an offset OS of a reference point (for example, the center) of the subject vehicle M from the center CL of the running lane and an angle θ of the advancement direction of the subject vehicle M formed with respect to lines connected at the center CL of the running lane in the advancement direction of the subject vehicle M as the relative position of the subject vehicle M with respect to the running lane L1. In addition, instead of this, the subject vehicle position recognizing unit 112 may recognize the position of a reference point of the subject vehicle M with respect to one side portion of the own lane L1 and the like as a relative position of the subject vehicle M with respect to the running lane.

The external system recognizing unit 114 recognizes states of surrounding vehicles such as positions, speeds, accelerations, and the like on the basis of information input from the finder 20, the radar 30, the camera 40, and the like. In this embodiment, a surrounding vehicle is a vehicle running in the vicinity of the subject vehicle M and is a vehicle running in the same direction as that of the subject vehicle M. The position of a surrounding vehicle may be represented as a representative point of another vehicle such as the center of gravity, a corner, or the like and may be represented by an area represented by the contour of another vehicle. The "state" of a surrounding vehicle may include an acceleration of a surrounding vehicle and whether a lane is being changed (or whether a lane is to be changed or not) on the basis of information of various devices described above. In addition, the external system recognizing unit 114 may recognize positions of a guard rail and a telegraph pole, a parked vehicle, a pedestrian, and other objects in addition to the surrounding vehicles.

The action plan generating unit 116 sets a start place of automatic driving and/or a destination of automatic driving. The start place of the automatic driving may be a current position of the subject vehicle M or may be a place at which an operation for directing automatic driving is performed. The action plan generating unit 116 generates an action plan in a section between the start place and the destination of the automatic driving. In addition, the action plan is not limited to this, and the action plan generating unit 116 may generate an action plan for an arbitrary section.

The action plan, for example, is configured of a plurality of events that are sequentially executed. The events, for example, include a deceleration event of decelerating the subject vehicle M, an acceleration event of accelerating the subject vehicle M, a lane keeping event of causing the subject vehicle M to run without deviating from a running lane, a lane changing event of changing a running lane, an overtaking event of causing the subject vehicle M to outrun a vehicle running ahead, a branching event of changing a lane to a desired lane at a branching point or causing the subject vehicle M to run without deviating from a current running lane, a merging event of accelerating/decelerating the subject vehicle M and changing a running lane in a merging lane for merging into a main lane, and the like. For example, in a case in which an intersection (branching point) is present on a toll road (for example, an expressway or the like), when a first or second automatic drive mode is executed, the automatic driving control device 100 changes or maintains lane such that the subject vehicle M advances in a direction of a destination. Accordingly, in a case in which it is determined that an intersection is present on a route by referring to the map information 152, the action plan generating unit 116 sets a lane changing event for changing the lane to a desired lane for advancement in a direction of a destination between a current position (coordinates) of the subject vehicle M and the position (coordinates) of the intersection. In addition, information representing the action plan generated by the action plan generating unit 116 is stored in the storage unit 150 as action plan information 156.

Figure 4:
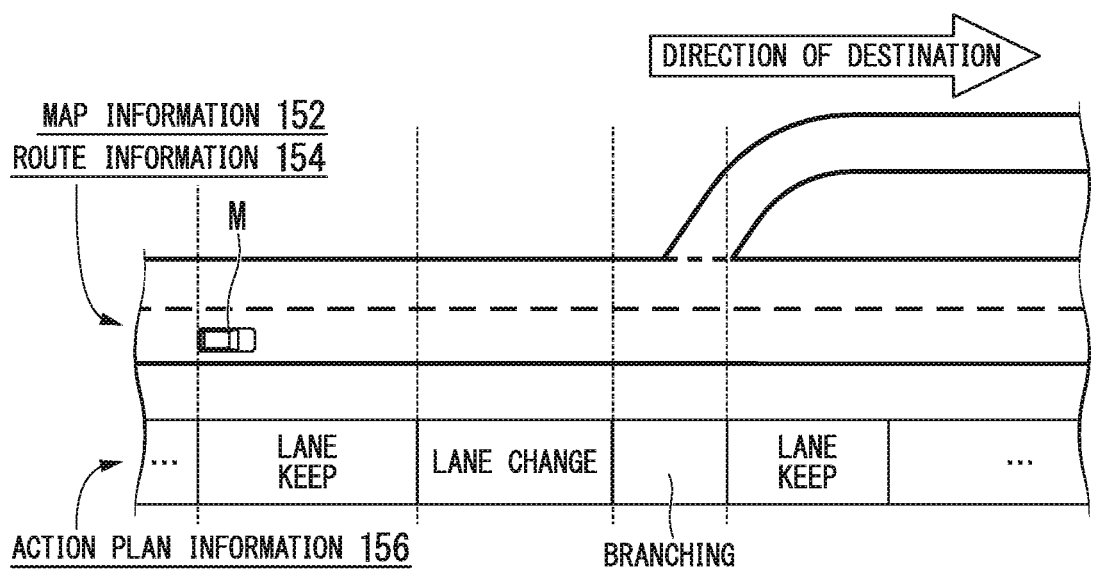
FIG. 4 is a diagram illustrating one example of an action plan generated for a certain section.

FIG. 4 is a diagram illustrating one example of an action plan generated for a certain section. As illustrated in the drawing, the action plan generating unit 116 classifies scenes generated in a case in which running along the route to the destination is executed and generates an action plan such that events conforming to the individual scenes are executed. In addition, the action plan generating unit 116 may dynamically change the action plan in accordance with a change in the status of the subject vehicle M.

For example, the action plan generating unit 116 may change (update) the generated action plan on the basis of the state of an external system recognized by the external system recognizing unit 114. Generally, while a vehicle runs, the state of the external system constantly changes. Particularly, in a case in which the subject vehicle M runs on a road including a plurality of lanes, distance intervals from the other vehicles relatively change. For example, in a case in which a vehicle ahead decelerates by applying sudden braking, or a vehicle running on a neighboring lane cuts in on the subject vehicle on the side in front, the subject vehicle M needs to run while appropriately changing speed and lane in accordance with the behavior of the vehicle ahead or the behavior of the vehicle running on an adjacent lane. Accordingly, the action plan generating unit 116 may change an event set for each control section in accordance with a change in the state of the external system as described above.

More specifically, in a case in which a speed of another vehicle recognized during the running of the vehicle by the external system recognizing unit 114 exceeds a threshold, or a moving direction of another vehicle running on a lane adjacent to the lane of the subject vehicle is toward the direction of the lane of the subject vehicle, the action plan generating unit 116 changes the event set in a driving section on which the subject vehicle M plans to run. For example, in a case in which an event is set such that the lane changing event is executed after the lane keeping event, when it is determined that a vehicle runs at a speed that is a threshold or more from the rear side of a lane that is a lane change destination during the lane keeping event in accordance with a result of the recognition of the external system recognizing unit 114, the action plan generating unit 116 changes the next event next of a lane keeping event from a lane changing event to a deceleration event, a lane keeping event, or the like. As a result, also in a case in which a change in the state of the external system occurs, the automatic driving control device 100 can appropriately cause the subject vehicle M to run automatically.

[Lane Keeping Event]

When the lane keeping event is executed, the action plan generating unit 116 determines one running mode among constant-speed running, following running, decelerated running, curve running, obstacle avoidance running, and the like. For example, in a case in which another vehicle is not present in front of the subject vehicle M, the action plan generating unit 116 determines constant-speed running as the running mode. In addition, in a case in which following running for a vehicle running ahead is to be executed, the action plan generating unit 116 determines following running as the running mode. Furthermore, in a case in which deceleration of a vehicle running ahead is recognized by the external system recognizing unit 114 or in a case in which an event of stopping, parking, or the like is to be executed, the action plan generating unit 116 determines the decelerated running as the running mode. In addition, in a case in which the subject vehicle M is recognized to have reached a curved road by the external system recognizing unit 114, the action plan generating unit 116 determines the curve running as the running mode. Furthermore, in a case in which an obstacle is recognized in front of the subject vehicle M by the external system recognizing unit 114, the action plan generating unit 116 determines the obstacle avoidance running as the running mode.

The locus generating unit 118 generates a locus on the basis of the running mode determined by the action plan generating unit 116. Here, a locus is a set (trajectory) of points acquired by sampling a future target position assumed to be reached at predetermined time intervals in a case in which the subject vehicle M runs on the basis of the running mode determined by the action plan generating unit 116. The locus generating unit 118 at least calculates a target speed of the subject vehicle M on the basis of a speed of a target OB present in front of the subject vehicle M recognized by the subject vehicle position recognizing unit 112 or the external system recognizing unit 114 and a distance between the subject vehicle M and the target OB. The locus generating unit 118 generates a locus on the basis of the calculated target speed. Here, the target OB includes a vehicle running ahead, places such as a merging place, a branching place, a target place, and the like, an object such as an obstacle, and the like.

Here, in a case in which the drive mode A is executed, a plurality of locus points including a speed element (time element) are generated, and, in the drive mode B, a trajectory or locus points not including a speed element (time element) are generated, and a speed at which running on the trajectory is executed is controlled on the basis of an operation of a vehicle occupant for an operation device. In addition, in the drive mode C, locus points or a trajectory is not generated, and only the speed is automatically determined on the basis of the running mode such as constant-speed running, following running, or decelerated running by the speed generating unit 120.

Figure 5:
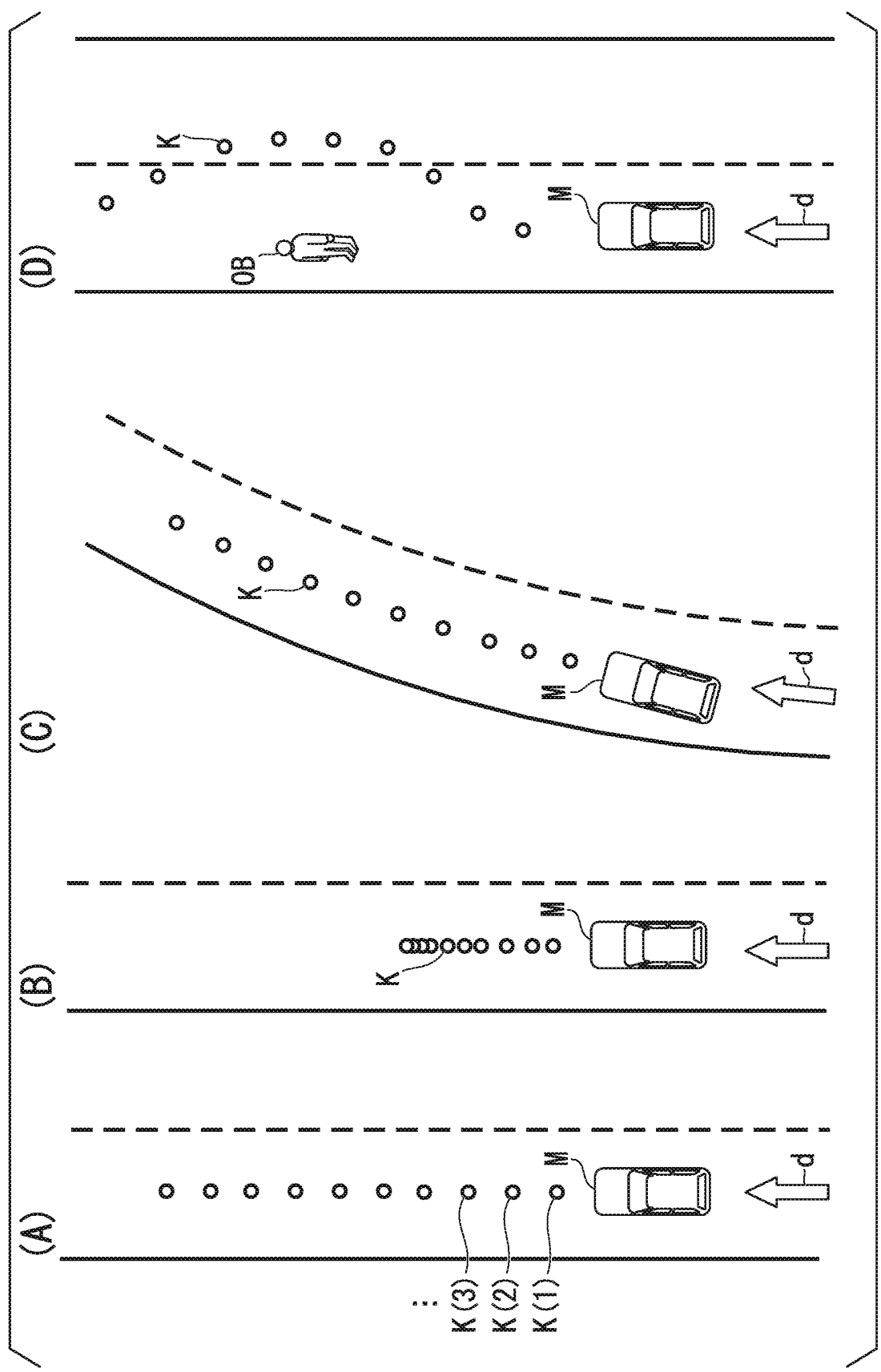
FIG. 5 is one example of loci generated by a locus generating unit 118.

Here, the drive mode A will be focused upon, and, particularly, generation of a trajectory in both a case in which the presence of a target OB is not assumed and a case in which the presence thereof is considered will be described. FIG. 5 is one example of loci generated by the locus generating unit 118. In the drawing, as illustrated in (A), for example, the locus generating unit 118 sets future target positions K(1), K(2), K(3), . . . with respect to the current position of the subject vehicle M as a reference every time when a predetermined time Δt elapses from the current time as a locus of the subject vehicle M. Hereinafter, in a case in which such target positions are not distinguished from each other, they will be simply referred to as "target position K." For example, the number of target positions K is determined in accordance with a target time T. For example, in a case in which the target time T is set as five seconds, the locus generating unit 118 sets a target position K for every predetermined time Δt (for example, 0.1 seconds) in this five seconds on a center line of the running lane and determines an arrangement gap between a plurality of target positions K on the basis of the running mode. The locus generating unit 118, for example, may derive the center line of the running lane from information of the width of a lane and the like included in the map information 152 or may acquire the center line from the map information 152 in a case in which the position of the center line is included in the map information 152 in advance.

For example, in a case in which the constant-speed running is determined as the running mode by the action plan generating unit 116 described above, the locus generating unit 118, as illustrated in (A) in the drawing, generates a locus by setting a plurality of target positions K at uniform intervals.

In addition, in a case in which the decelerated running is determined as the running mode by the action plan generating unit 116 (including a case in which a vehicle running ahead decelerates in the following running), the locus generating unit 118, as illustrated in (B) in the drawing, generates a locus by increasing the space for a target position K at which the arrival time is earlier and decreases the space for a target position K at which the arrival time is later. In such a case, there are cases in which a vehicle running ahead is set as a target OB, or a place such as a merging place, a branching place, a target place, or the like, an obstacle, or the like other than the vehicle running ahead is set as a target OB. Accordingly, a target position K at which arrival time of the subject vehicle M is late becomes close to the current position of the subject vehicle M, and thus, the running control unit 130 to be described later decelerates the subject vehicle M.

In addition, as illustrated in (C) in the drawing, in a case in which the curve running is determined as the running mode, the locus generating unit 118, for example, generates a locus by disposing a plurality of target positions K with a horizontal position (a position in the direction of the width of the lane) changed with respect to the advancement direction of the subject vehicle M in accordance with the curvature of the road. Furthermore, as illustrated in (D) in the drawing, in a case in which an obstacle OB such as a person, a stopped vehicle, or the like is present on the road in front of the subject vehicle M, the action plan generating unit 116 determines the obstacle avoidance running as the running mode. In such a case, the locus generating unit 118 generates a locus by disposing a plurality of target positions K such that the subject vehicle runs with the obstacle OB being avoided.

[Lane Changing Event]

In addition, in a case in which the lane changing event is executed, the locus generating unit 118 executes a process such as setting of a target position, a lane change determination, lane change locus generation, and a locus evaluation. In addition, also in a case in which the branching event or the merging event is executed, the locus generating unit 118 may execute a similar process.

Figure 6:
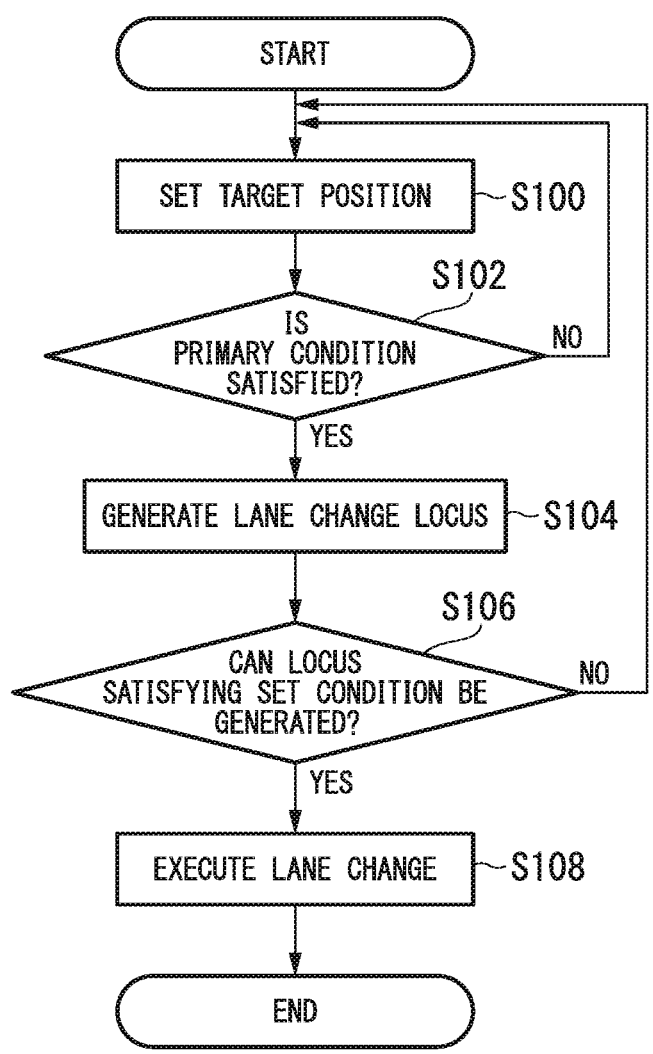
FIG. 6 is a flowchart illustrating one example of the flow of a process executed in a case in which a lane changing event is executed.

FIG. 6 is a flowchart illustrating one example of the flow of a process executed in a case in which the lane changing event is executed. The process will be described with reference to this drawing and FIG. 7.

First, the locus generating unit 118 specifies a vehicle running in a lane adjacent to a lane (own lane), in which the subject vehicle M runs, that is a lane adjacent to a lane change destination and running in front of the subject vehicle M and a vehicle running in the adjacent lane and running in back of the subject vehicle M and sets a target position TA between these vehicles (Step S100). Hereinafter, in description, the vehicle running in an adjacent lane and running in front of the subject vehicle M will be referred to as a front reference vehicle, and the vehicle running in an adjacent lane and running in back of the subject vehicle M will be referred to as a back reference vehicle. The target position TA is a relative position based on positional relations between the subject vehicle M and the front reference vehicle and the back reference vehicle.

Figure 7:
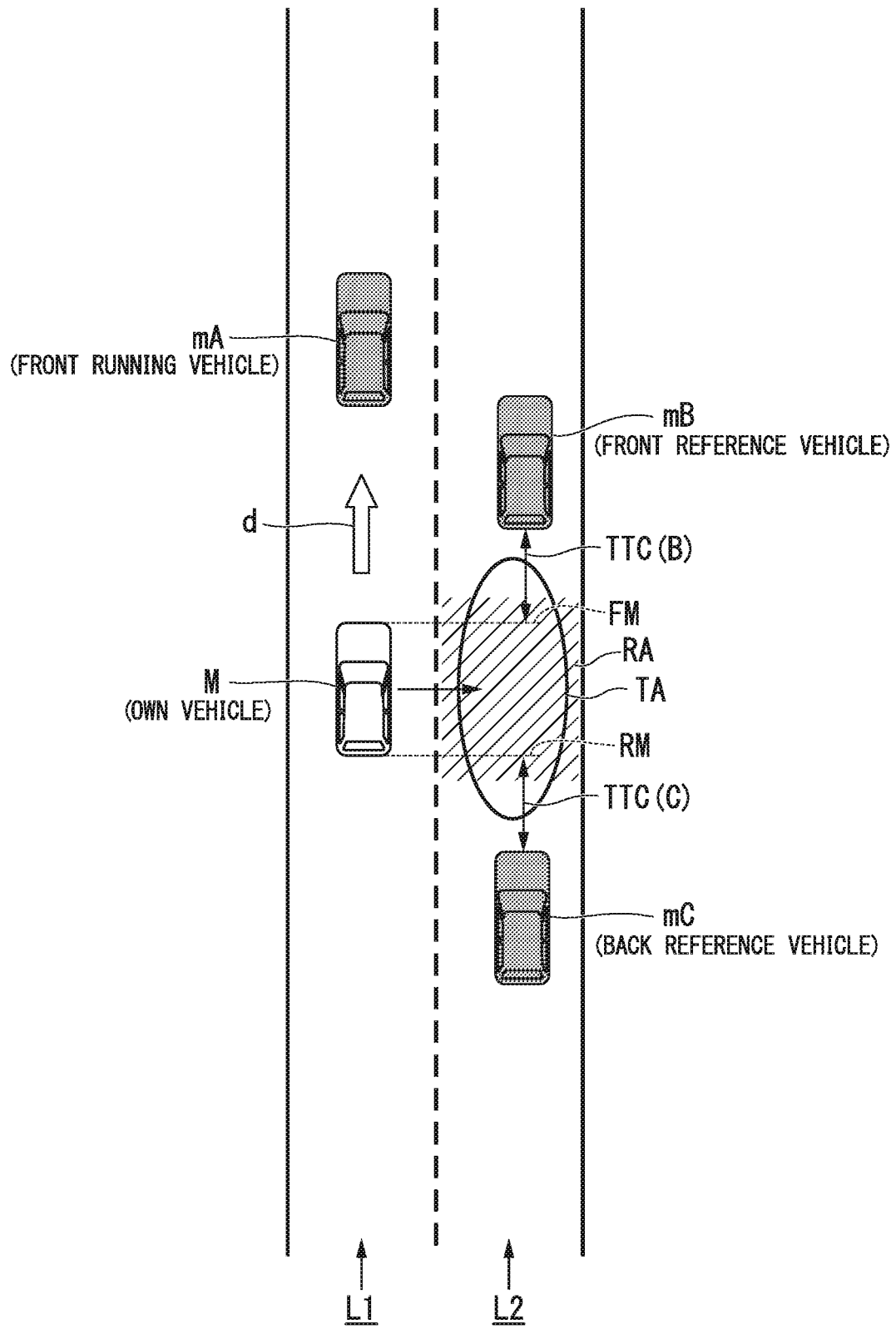
FIG. 7 is a diagram illustrating a view in which a target position TA is set.

FIG. 7 is a diagram illustrating a view in which the target position TA is set. In the drawing, mA represents a vehicle running ahead, mB represents the front reference vehicle, and mC represents the back reference vehicle. In addition, an arrow d represents an advancement (running) direction of the subject vehicle M, L1 represents the own lane, and L2 represents an adjacent lane. In the example illustrated in FIG. 7, the target position setting unit 122 sets a target position TA on the adjacent lane L2 between the front reference vehicle mB and the back reference vehicle mC.

Next, the locus generating unit 118 determines whether or not a primary condition used for determining whether or not a lane change to the target position TA (in other words, between the front reference vehicle mB and the back reference vehicle mC) is satisfied (Step S102).

The primary condition, for example, is that at least part of a surrounding vehicle is not present in a prohibition area RA disposed in an adjacent lane, and a time-to-collision (TTC) between the subject vehicle M and each of the front reference vehicle mB and the back reference vehicle mC is larger than a threshold. In a case in which the primary condition is not satisfied, the locus generating unit 118 returns the process to Step S100 and resets the target position TA. At this time, standby up to a timing at which a target position TA satisfying the primary condition can be set may be performed, or the target position TA may be set before the front reference vehicle mB or after the back reference vehicle mC, and speed control for moving to a lateral side of the target position TA may be executed.

As illustrated in FIG. 7, the locus generating unit 118, for example, projects the subject vehicle M to a lane L2 that is a lane change destination and sets the prohibition area RA keeping a slight marginal distance before and after the projected subject vehicle M. The prohibition area RA is set as an area extending from one end of the lane L2 in the horizontal direction to the other end.

In a case in which a surrounding vehicle is not present inside the prohibition area RA, the locus generating unit 118, for example, assumes an extended line FM and an extended line RM acquired by virtually extending a front end and a rear end of the subject vehicle M to the side of the lane L2 that is the lane change destination. The locus generating unit 118 calculates a time-to-collision TTC(B) of the extended line FM and the front reference vehicle mB and a time-to-collision TTC(C) of the extended line RM and the back reference vehicle mC. The time-to-collision TTC(B) is a time derived by dividing a distance between the extended line FM and the front reference vehicle mB by a relative speed between the subject vehicle M and the front reference vehicle mB. The time-to-collision TTC(C) is a time derived by dividing a distance between the extended line RM and the back reference vehicle mC by a relative speed between the subject vehicle M and the back reference vehicle mC. The locus generating unit 118 determines that the primary condition is satisfied in a case in which the time-to-collision TTC(B) is larger than a threshold Th(B), and the time-to-collision TTC(C) is larger than a threshold Th(C). The thresholds Th(B) and Th(C) may have the same values or different values.

Figure 8:
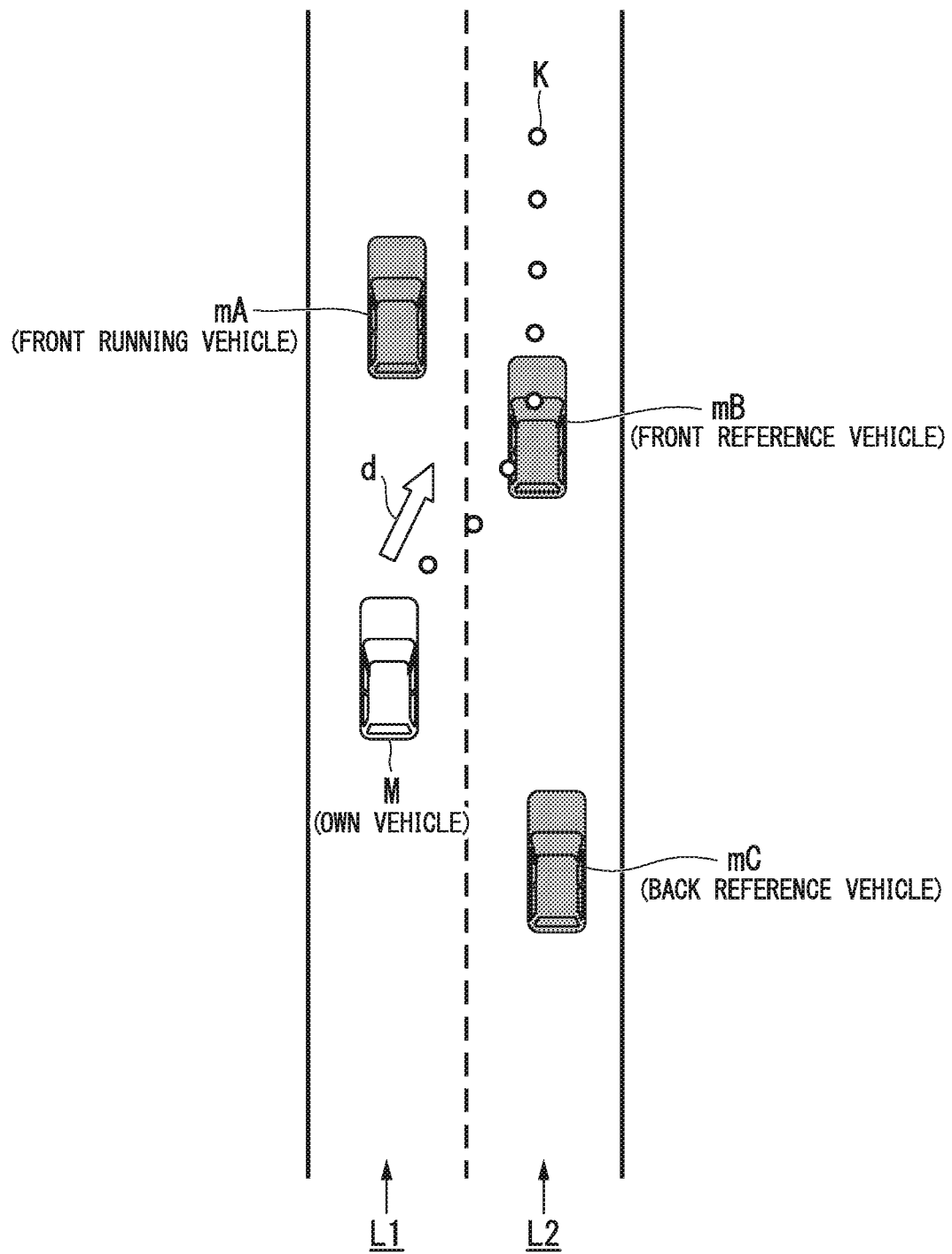
FIG. 8 is a diagram illustrating a view in which a locus for changing a lane is generated.

In a case in which the primary condition is satisfied, the locus generating unit 118 generates a locus used for a lane change (Step S104). FIG. 8 is a diagram illustrating a view in which a locus for changing a lane is generated. For example, the locus generating unit 118 assumes that a vehicle mA running ahead, the front reference vehicle mB, and the back reference vehicle mC runs at predetermined speed models and generates a locus on the basis of the speed models of these three vehicles and the speed of the subject vehicle M such that the subject vehicle M does not interfere with the vehicle mA running ahead and is positioned between the front reference vehicle mB and the back reference vehicle mC at a certain time in the future. For example, the locus generating unit 118 smoothly connects from the current position of the subject vehicle M to the position of the front reference vehicle mB at a certain time in the future, the center of a lane that is a lane change destination, and an end place of the lane change using a polynomial curve such as a spline curve or the like and arranges a predetermined number of target positions K at uniform intervals or non-uniform intervals on this curve. At this time, the locus generating unit 118 generates a locus such that at least one of the target positions K is disposed inside the target position TA.

Next, the locus generating unit 118 determines whether or not a locus satisfying a setting condition has been generated (Step S106). Here, the setting condition, for example, is that an acceleration/deceleration speed, a deflection angle, and an assumed yaw rate, and the like are within predetermined ranges for each locus point. In a case in which the locus satisfying the setting condition has been generated, the locus generating unit 118 outputs information of a locus used for the lane change to the running control unit 130 and causes the lane change (Step S108). On the other hand, in a case in which a locus satisfying the setting condition cannot be generated, the locus generating unit 118 returns the process to Step S110. At this time, similar to a case in which "No" is determined in Step S102, a standby state may be caused, or a process of resetting the target position TA may be executed.

The speed generating unit 120 operates in a case in which the drive mode C is executed. The speed generating unit 120 generates a speed on the basis of the running mode such as the constant-speed running, the following running, and the decelerated running

[Running Control]

The running control unit 130 sets one of the drive modes A to D as the drive mode under the control of the switching control unit 140 and controls control targets including some or all of the running driving force output device 90, the steering device 92, and the brake device 94 in accordance with the set drive mode. In addition, the running control unit 130 may appropriately adjust the determined amount of control on the basis of a result of detection acquired by the vehicle sensor 60.

In a case in which the drive mode A is executed, the running control unit 130 performs control of the running driving force output device 90, the steering device 92, and the brake device 94 such that the subject vehicle M passes through the locus generated by the locus generating unit 118 at a planned time.

In a case in which the drive mode B is executed, the running control unit 130 performs control of the steering device 92 such that the subject vehicle M runs in accordance with the locus generated by the locus generating unit 118.

In a case in which the drive mode C is executed, the running control unit 130 performs control of the running driving force output device 90 and the brake device 94 such that the subject vehicle M runs at a speed generated by the speed generating unit 120.

In a case in which the drive mode D is executed, the running control unit 130, for example, directly outputs an operation detection signal input from an operation detection sensor such as the acceleration pedal 70, the brake pedal 72, or the like to the running driving force output device 90, the steering device 92, and the brake device 94. In addition, in a case in which a control direction from the unexpected event avoiding control device 200 is received, the running control unit 130 stops the automatic driving control with a priority with respect to the executed automatic driving control.

[Switch Control]

The switching control unit 140 performs switching of a drive mode on the basis of a drive mode designation signal input from the changeover switch 80 and performs switching of the drive mode on the basis of an operation directing acceleration, deceleration, or steering for an operation device. In addition, near a destination of the automatic driving, the switching control unit 140 switches the drive mode from one of the drive modes A, B, and C to the drive mode D.

Hereinafter, the switching between drive modes based on the amount of an operation for an operation device will be described. As a principle, in a case in which the drive mode A is executed, when the amount of an operation (an accelerator opening degree or a brake depression amount) for the acceleration pedal 70 or the brake pedal 72 exceeds a threshold of each thereof, the switching control unit 140 switches the drive mode to the drive mode B.

In addition, in a case in which the drive mode A is executed, when the amount of an operation (for example, the amount of change in the steering angle, a steering angle, or a steering torque) for the steering wheel 74 exceeds a threshold, the switching control unit 140 switches the drive mode to the drive mode C.

Furthermore, in a case in which the drive mode A is executed, when the amount of an operation for the acceleration pedal 70 or the brake pedal 72 exceeds a threshold of each thereof, and the amount of an operation for the steering wheel 74 exceeds a threshold, the switching control unit 140 switches the drive mode to the drive mode D.

In addition, in a case in which the drive mode B is executed, when the amount of an operation for the steering wheel 74 exceeds a threshold, the switching control unit 140 switches the drive mode to the drive mode D.

Furthermore, in a case in which the drive mode C is executed, when the amount of an operation for the acceleration pedal 70 or the brake pedal 72 exceeds a threshold of each thereof, the switching control unit 140 switches the drive mode to the drive mode D.

In the case of switching to a drive mode of which the degree of automatic driving is higher (in the case of switching from the drive mode D to another drive mode or from the drive mode B or the drive mode C to the drive mode A), the switching control unit 140 executes the switching on the basis of a drive mode designation signal input from the changeover switch 80. In addition, control of returning to the drive mode A when there is no operation of the acceleration pedal 70 and the brake pedal 72 for a predetermined time after the drive mode is switched to the drive mode B from the drive mode A on the basis of an operation of the acceleration pedal 70 may be executed (similarly for a combination of different drive modes).

[Unexpected Event Avoiding Control Device]

The unexpected event avoiding control device 200 will be described with reference to FIG. 2 described above. The unexpected event avoiding control device 200, for example, includes a relative position detecting unit 210, an avoidance control unit 230, and a storage unit 250. Part or all of each of the relative position detecting unit 210 and the avoidance control unit 230 is realized by executing a program using a processor such as a CPU or the like. In addition, part or all thereof may be realized by hardware such as an LSI, an ASIC, or the like.

The storage unit 250 is realized using a ROM, a RAM, an HDD, a flash memory, or the like. The program executed by the processor may be stored in the storage unit 250 in advance or may be downloaded from external device through an in-vehicle internet facilities or the like. In addition, the program may be installed in the storage unit 250 by loading a portable storage medium storing the program into a drive device not illustrated in the drawing. In addition, the unexpected event avoiding control device 200 may be distributed in a plurality of computer devices.

The relative position detecting unit 210 detects a position and a speed of a target that is an avoidance target object on the basis of information input from sensors such as the radar 30, the camera 40, and the like. A target detected by the relative position detecting unit 210 is not limited to another vehicle moving in the advancement direction of the subject vehicle, and, for example, may include another vehicle moving to oppose the advancement direction of the subject vehicle. The position of a surrounding vehicle may be represented as a representative point of another vehicle such as the center of gravity, a corner, or the like and may be represented by an area represented by the contour of another vehicle. In addition, the relative position detecting unit 210 may recognize positions of a guard rail and a telegraph pole, a parked vehicle, a pedestrian, and other objects in addition to the surrounding vehicles. In the following description, avoidance target objects of which the positions are recognized as described above will be referred to as surrounding vehicles and the like and are targets for the unexpected event avoiding control device 200. For example, the relative position detecting unit 210 and sensors such as the radar 30, the camera 40, and the like are examples of an avoidance target object detecting unit.

The avoidance control unit 230 detects that the subject vehicle M approaches a detected target within a predetermined range on the basis of a result of detection of the target detected by the relative position detecting unit 210. For example, in a case in which the approach is detected, the avoidance control unit 230 executes at least steering of the subject vehicle M with a priority with respect to steering executed by the automatic driving control device 100.

For example, the avoidance control unit 230 may detect a case in which the moving direction of another vehicle is the direction of the lane of the subject vehicle, and it is determined that the vehicle closes the course as an unexpected event in addition to a case in which the speed of another vehicle recognized by the relative position detecting unit 210 exceeds a threshold or runs a lane adjacent to the lane of the subject vehicle. The avoidance control unit 230 changes the running state of the subject vehicle M such that it avoids the unexpected event. For example, the avoidance control unit 230 directs steering using auto emergency steering (AES) control. The AES control is control of adjusting the advancement direction of the subject vehicle M using emergency avoidance steering to avoid an unexpected event. In addition, the avoidance control unit 230 directs auto emergency brake (AEB) control or deceleration using control of switching of the running drive mode of the engine. Here, the AEB control is control of braking the subject vehicle M using emergency brake to avoid an unexpected event.

The avoidance control unit 230 directs braking using emergency brake using the AEB control for the brake device 94, directs emergency avoidance steering using the AES control for the steering device 92, and directs to decrease the running driving force of the engine for the running driving force output device 90. The avoidance control unit 230 directs to stop the automatic driving control for the automatic driving control device 100.

Accordingly, even in a case in which an unexpected event occurs in accordance with a surrounding vehicle or the like in the advancement direction of the subject vehicle M, the unexpected event avoiding control device 200 appropriately causes the subject vehicle M to avoid the unexpected event.

[Unexpected Event Avoiding Process]

Figure 9:
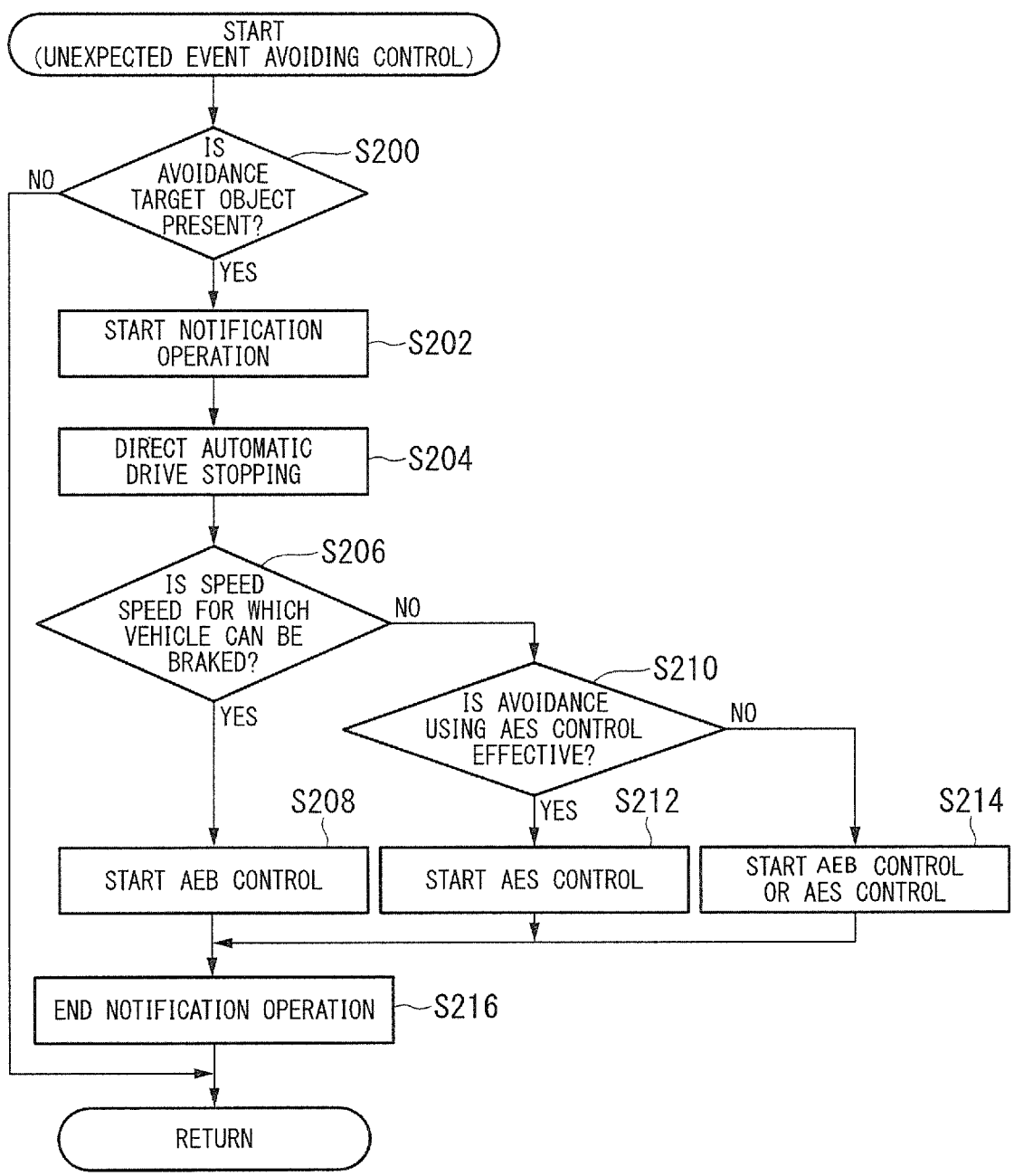
FIG. 9 is a flowchart illustrating the sequence of an unexpected event avoiding process in an unexpected event detecting device.

FIG. 9 is a flowchart illustrating the sequence of an unexpected event avoiding process in the unexpected event detecting device.

The relative position detecting unit 210 calculates a distance to a target on the basis of information input from sensors such as the radar 30, the camera 40, and the like and detects a relative position of a target with respect to the subject vehicle M. The avoidance control unit 230 calculates a speed for the target on the basis of a result of the detection using the relative position detecting unit 210. The avoidance control unit 230 determines whether or not an avoidance target object that is a target is present (S200) and ends a series of the process in a case in which the avoidance target object is not present.

On the other hand, in a case in which an avoidance target object is present, by controlling the pre-operation alarm device 96, the avoidance control unit 230 starts a notification operation of notifying of execution of the automatic drive stopping control for stopping the automatic driving control and continues the notification operation (S202).

Next, the avoidance control unit 230 directs the automatic driving control device 100 to execute the automatic drive stopping and stops the automatic driving (S204). For example, after the direction of the automatic drive stopping is received, the automatic driving control device 100 stops the automatic driving control in a speedy manner. In other words, in order for the avoidance control unit 230 to execute a process with a priority, the avoidance control unit 230 stops the automatic driving control using the automatic driving control device 100 and prevents the automatic driving control and the unexpected event avoiding control from interfering with each other. In addition, in a case in which the control described above is received while the pre-operation alarm device 96 continues the notification operation of notifying of the execution of the automatic drive stopping control, the automatic driving control device 100 ends the automatic driving control.

Next, the avoidance control unit 230 determines whether or not the speed for the target is a speed at which the subject vehicle M can appropriately brakes in accordance with deceleration control (S206). For example, the avoidance control unit 230 determines whether or not the speed of the subject vehicle M for the target is a predetermined value set in advance or less.

Next, in a case in which the speed for the target is determined as being a speed at which the subject vehicle M can appropriately brake using deceleration control, the avoidance control unit 230 operates the AEB control (S208). For example, the avoidance control unit 230 directs the brake device 94 to operate emergency brake. The avoidance control unit 230 continues to execute the process of S210.

Next, in a case in which the speed for the target is determined as not being a speed at which the subject vehicle M can appropriately brake using deceleration control, the avoidance control unit 230 determines whether or not avoidance using the AES control can be achieved (S210). For example, the avoidance control unit 230 determines whether or not a distance at which avoidance using the AES control can be achieved is secured on the basis of a condition set in advance. The condition set in advance described above is that acceleration applied to the subject vehicle M in a direction orthogonal to the advancement direction (horizontal direction) does not exceed a predetermined value when the advancement direction is adjusted using the AES control. In addition, instead of the acceleration in the direction orthogonal to the advancement direction (horizontal direction), the avoidance control unit 230 may use a yaw rate.

Next, in a case in which it is determined that avoidance using the AES control can be achieved, the avoidance control unit 230 operates the AES control (S212). For example, in the case described above, the avoidance control unit 230 directs the steering device 92 to operate emergency steering. The avoidance control unit 230 continues to execute the process of S210.

On the other hand, in a case in which avoidance using the AES control cannot be achieved, in other words, in a case in which it is determined that avoidance using the AEB control and avoidance using the AES control cannot be achieved, the avoidance control unit 230 operates one or both of the avoidance using the AEB control and the avoidance using the AES control (S214). For example, in the case described above, the avoidance control unit 230 selects at least one of the AEB control and the AES control depending on the surrounding status of the subject vehicle M in which the subject vehicle M is put. The avoidance control unit 230 directs the steering device 92 to operate emergency steering or directs the brake device 94 to operate emergency brake in accordance with the selected control method.

Next, after the process of avoiding approach to the target is ended by executing the process of S208, S212, or S214, the avoidance control unit 230 ends the notification operation of notifying of the execution of the automatic drive stopping control by controlling the pre-operation alarm device 96 (S216).

Figure 10:
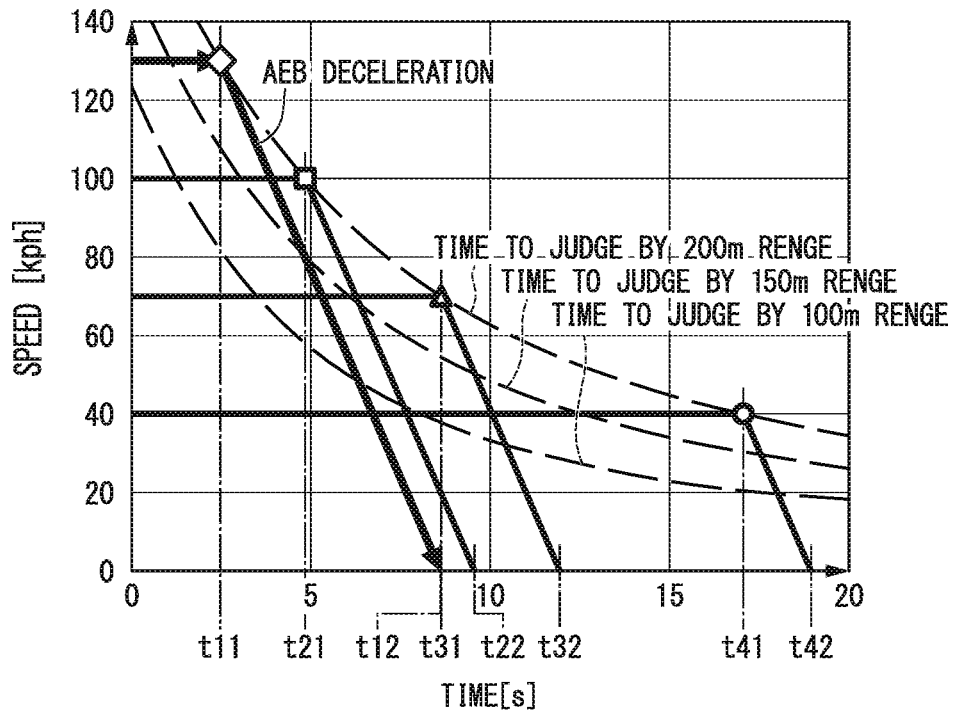
FIG. 10 is a diagram illustrating an unexpected event avoiding control.

The unexpected event avoiding control described above will be described with reference to FIGS. 10 and 11. FIG. 10 is a diagram illustrating the unexpected event avoiding control. FIG. 10 illustrates several examples of avoiding an occurrence of an obstacle according to an unexpected event when the subject vehicle M running at a predetermined speed (vertical axis: speed) starts an operation of avoiding a target in accordance with elapse of time (horizontal axis: time).

For example, at a time t0, a distance to the target from the subject vehicle M running at 130 kph (km/hour) is assumed to be 200 m. In a case in which the subject vehicle M runs with the speed maintained (void running), the subject vehicle M reaches the target at a time t11. In contrast to this, by starting deceleration of the subject vehicle M until the time t11, the target can be avoided without brought into contact with the target. A straight line inclined right downward illustrated at the time t11 to a time t12 represents a control model in which the subject vehicle M is determined to execute a uniformly accelerated motion without exceeding a limit (upper limit value) of the acceleration set in advance.

Even when the unexpected event avoiding control device 200 detects the presence of a target, the subject vehicle M executes void running until the subject vehicle M starts an avoidance operation, and thus, there is no margin in a time allowed until the subject vehicle M starts the avoidance operation. For example, an allowed time in a case in which the subject vehicle running at 130 kph (km/hour) detects the presence of a target of a 200 m destination is only several seconds. Within this time, even when the occurrence of an unexpected event is notified to a driver of the subject vehicle m, there is no margin in time for the driver only to succeed in the drive instead of the automatic driving control of the automatic driving control device 100. In this way, within a limited time, the unexpected event avoiding control device 200 selects an avoidance operation to be performed thereafter, and the avoidance operation is caused to be performed.

In addition, the case of a different speed of 100 kph, 70 kph, or 40 kph is similar to the case of 130 kph described above. For example, a time t21 and a time t22 in the case of 100 kph, a time t31 and a time t32 in the case of 70 kph, and a time t41 and a time t42 in the case of 40 kph respectively correspond to the time t11 and the time t12 described above.

In addition, the description described above illustrates a case in which the distance to the target is 200 m as an example, and, in a case in which the distance to the target is 150 m or 100 m, a void-running distance until the subject vehicle M starts an avoidance operation is shorter than that of the case of 200 m descried above as an example.

After detecting the occurrence of an unexpected event pertaining to a target, the unexpected event avoiding control device 200 starts control for avoiding to be brought into contact with the target in a speedy manner, and thus, the occurrence of an obstacle according to the unexpected event can be avoided.

Figure 11:
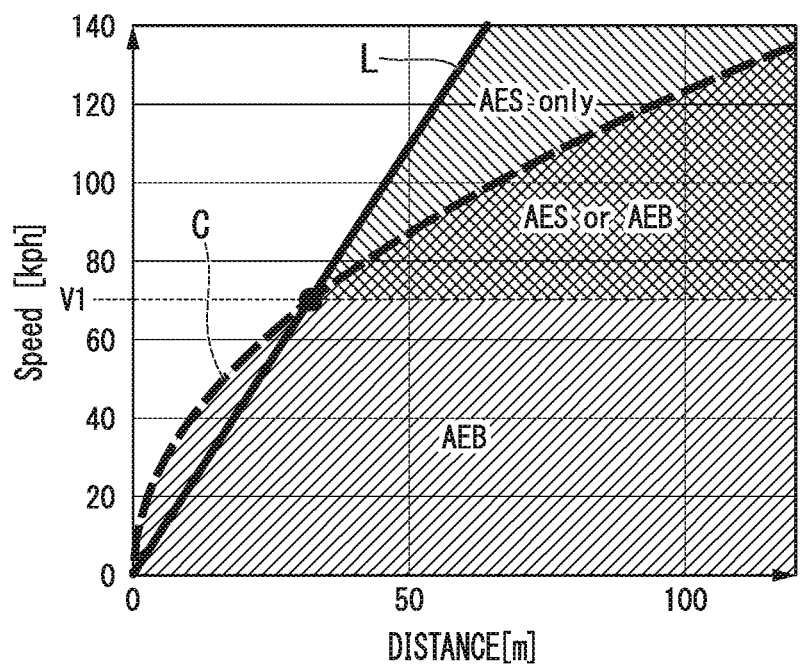
FIG. 11 is a diagram illustrating a condition for selecting avoidance control using an unexpected event avoiding control device 200.

FIG. 11 is a diagram illustrating a condition for selecting avoidance control using the unexpected event avoiding control device 200. A graph illustrated in FIG. 11 illustrates a relation between a distance to a target (horizontal axis: distance) and a speed of the subject vehicle M for the target (horizontal axis: speed).

A straight line L represents a distance at which an unexpected event is determined to be avoidable using the AES control. For example, the straight line L illustrates an avoidable limit using the AES control under a condition using an upper limit value of the horizontal acceleration generated in accordance with steering of the subject vehicle M. A slope of this straight line L is determined by the magnitude of horizontal acceleration set as the condition and may be changed to a slope other than that illustrated in the drawing. The unexpected event avoiding control device 200 plots each point corresponding to a distance to a target and a speed of the subject vehicle M for the target on the graph. In a case in which the position is located on the right side of the straight line in the graph, the subject vehicle M can avoid an unexpected event pertaining to the target by steering the subject vehicle M such that the horizontal acceleration is the upper limit value of the horizontal acceleration described above or less. In a case in which a distance to the target is a distance, at which deceleration can be achieved with the horizontal acceleration being the upper limit value or less, or more, the avoidance control unit 230 determines that an unexpected event pertaining to the target can be avoided by decelerating the subject vehicle M.

A curve C represents a distance at which an unexpected event pertaining to the target is determined to be avoidable by decelerating the subject vehicle M using the ABS control or the like. For example, the curve C illustrates an avoidable limit using the ABS control under a condition using an upper limit value of acceleration generated in accordance with deceleration of the subject vehicle M. The acceleration described above takes a negative value in a case in which the advancement direction is set to be positive, and, in the following description, it will be simply referred to as deceleration. This curve C is determined in accordance with the magnitude of an upper limit value of acceleration set as the condition and is defined as a convex function in the illustrated graph. In other words, the curve C has a trend in which a distance to a target increases in accordance with an increase in the relative speed, and a rate of change of the distance increases in accordance with an increase in the relative speed. In addition, the curve C may be changed to a curve other than the illustrated curve. The unexpected event avoiding control device 200 plots each point corresponding to a distance to the target and a speed of the subject vehicle M for the target on the graph. In a case in which the position is located on a lower right side of this curve C in the graph, the subject vehicle M can avoid an unexpected event pertaining to the target even when the subject vehicle M brakes with acceleration being the upper limit value of the acceleration or less. In a case in which the distance to the target is a distance, at which the subject vehicle can be decelerated with deceleration being an upper limit value or less, the avoidance control unit 230 determines that an unexpected event pertaining to the target can be avoided by decelerating the subject vehicle M.

In a case in which a point corresponding to a distance to a target and a speed of the subject vehicle M for the target is positioned to the right side of one of the straight line L and the curve C illustrated in this graph, the unexpected event avoiding control device 200 can appropriately avoid the target.

For example, in a case in which the speed is in a speed region of a speed V1 or less, the curve C is positioned to the left side of the straight line L in the graph. In other words, in a case in which the speed is in a speed region of the speed V1 or less, the unexpected event avoiding control device 200 has a wider range in which an unexpected event pertaining to the target can be appropriately avoided in a case in which deceleration control using the ABS control or the like is executed than in a case in which the AES control is executed. In this speed region, it is preferable that the unexpected event avoiding control device 200 should select the avoidance using deceleration control.

On the other hand, in a case in which the speed is in a speed region exceeding the speed V1, the positional relation between the curve C and the straight line L in the drawing is reversed, and the straight line L is positioned to the left side of the curve C. In other words, in a case in which the speed is in a speed region exceeding the speed V1, by executing the AES control, a range in which an unexpected event pertaining to the target can be avoided is widened. In this speed region, it is preferable that the unexpected event avoiding control device 200 should select avoidance using steering.

In the latter case, in a case in which a point corresponding to a distance to a target and a speed of the subject vehicle M for the target is positioned in an area positioned to the right side of the curve C, the unexpected event avoiding control device 200 can avoid an unexpected event pertaining to the target by executing the AES control or the ABS control.

In addition, in a case in which a point corresponding to a distance to a target and a speed of the subject vehicle M for the target is positioned in an area positioned to the right side of the straight line L and to the left side of the curve C, there may be cases in which the subject vehicle M cannot completely brake even when emergency brake using the ABS control is executed. Also in such cases, the unexpected event avoiding control device 200 can avoid an unexpected event pertaining to the target by executing the AES control.

In this way, the unexpected event avoiding control device 200 determines a control method used for avoiding an unexpected event on the basis of a distance to a target and a speed of the subject vehicle M for the target, whereby an unexpected event pertaining to the target can be avoided using a safer method.

The automatic driving control device 100 according to the embodiment described above executes automatic driving control for automatically controlling one or both of acceleration/deceleration and steering of the subject vehicle M such that the subject vehicle M runs along a route to a destination. The relative position detecting unit 210 of the unexpected event avoiding control device 200 detects a target that is a target object to be avoided in the vicinity of the subject vehicle M. The avoidance control unit 230, in a case in which approach of the subject vehicle M to the target within a predetermined range is detected on the basis of a result of detection of the target, executes avoidance control of automatically controlling one or both of acceleration/deceleration and steering of the subject vehicle M with a priority with respect to automatic driving control, thereby performing an avoidance operation. Accordingly, the vehicle control device 1 can appropriately avoid an unexpected event that may be an obstacle for the advancement of the vehicle. In addition, in a period in which the avoidance control unit 230 executes the process with a priority, the supply of a driving force to the subject vehicle M can be blocked, and a distance until the subject vehicle M stops can be shortened, or a force applied to the subject vehicle M at the time of steering can be decreased.

Furthermore, before the execution of an avoidance operation, the pre-operation alarm device 96 performs a visible, audible, or tactile notification operation for an occupant of the subject vehicle M. The automatic driving control device 100 can end the automatic driving control while a notification operation is performed using the pre-operation alarm device 96 or when the notification operation ends.

In addition, also in a case in which automatic driving control using the automatic driving control device 100 is not performed, the unexpected event avoiding control device 200 may be configured to control at least steering of the subject vehicle M with a priority with respect to steering according to a driver's operation from a viewpoint of preventing the occurrence of an obstacle in advance.

In addition, the unexpected event avoiding control device 200 functions independently from the automatic driving control using the automatic driving control device 100, whereby interpolation of a result of determination of automatic driving control using the automatic driving control device 100 and detection of a malfunction of part of the function for executing the automatic driving control can be performed.

In addition, in a case in which the relative speed of the subject vehicle M for the target exceeds a predetermined value, the avoidance control unit 230 may control at least the steering of the subject vehicle M with a priority with respect to the steering using the automatic driving control device 100 on the basis of a result of recognition of the vicinity of the subject vehicle M. Accordingly, in the case described above, the subject vehicle M can be controlled through steering, and a case in which an unexpected event cannot be avoided by brake control can be interpolated.

The predetermined value described above is a lower limit value of the speed for which an unexpected event can be determined to be avoided by changing the advancement direction through steering than by decelerating the subject vehicle M. Accordingly, the vehicle control device 1 can easily determine the predetermined value used for the determination of the speed of the subject vehicle M on the basis of a range in which an unexpected event can be avoided by changing the advancement direction through steering, and, by effectively using the range described above in which an unexpected event can be determined to be avoidable, an unexpected event that may be an obstacle for the advancement of the vehicle can be appropriately avoided.

In addition, in a case in which the relative speed for the target exceeds the predetermined value, and a target is present at a distance for which an avoidance operation can be performed through steering, the avoidance control unit 230 controls at least the steering of the subject vehicle M with a priority with respect to the steering using the automatic driving control device 100. Accordingly, in a case in which a target is present at a distance for which an avoidance operation can be performed through steering even when the relative speed for the target exceeds the predetermined value, by controlling the steering of the subject vehicle M with a priority with respect to the steering using the automatic driving control device 100, the vehicle control device 1 can perform control for appropriately avoiding an unexpected event.

In addition, in a case in which a distance to a target is a distance, for which the subject vehicle can be decelerated with the deceleration being the predetermined value or less, or more, the avoidance control unit 230 determines that an unexpected event can be avoided by decelerating the subject vehicle M. Accordingly, the vehicle control device 1 can identify a target that can be avoided by decelerating the subject vehicle M.

In a case in which a distance to a target is a reference distance, which is set in accordance with a trend in which the distance increases in accordance with an increase in the relative speed, and a rate of change of the distance increases in accordance with an increase in the relative speed, or more, the avoidance control unit 230 avoids the target through deceleration. Accordingly, the vehicle control device 1 can identify a target that can be avoided by decelerating the subject vehicle M.

In addition, in a case in which the distance is longer than a reference distance that linearly increases in accordance with an increase in the relative speed for the target, the avoidance control unit 230 avoids the target through steering. Accordingly, the vehicle control device 1 can appropriately avoid an unexpected event pertaining to the target.

In addition, in a case in which the distance is a distance for which the subject vehicle can be decelerated at a yaw rate of a predetermined value or less, the avoidance control unit 230 may determine that the target can be avoided through steering. Accordingly, the vehicle control device 1 can determine a distance for which a target can be determined to be avoidable by decelerating the subject vehicle M in a range in which a yaw rate according to the steering does not exceed an upper limit value thereof.

In addition, in a case in which a distance for which a target can be avoided by decelerating the subject vehicle M is longer than a distance for which a target is regarded to be avoidable through steering, the avoidance control unit 230 may control the steering of the subject vehicle M. Accordingly, also in a case in which a calculated distance at which a target can be avoided through deceleration is longer than a distance at which a target can be avoided through steering, the vehicle control device 1 can appropriately avoid an unexpected event pertaining to the target by controlling the steering of the subject vehicle M.

According to the vehicle control device 1, the vehicle control method, and the vehicle control program of the first embodiment described above, the vehicle control device 1 includes: the automatic driving control device 100 automatically controlling one or both of the acceleration/deceleration and the steering of the subject vehicle M such that the subject vehicle M runs along a route to a destination; the relative position detecting unit 210 detecting an avoidance target object that is a target object to be avoided in the vicinity of the subject vehicle M; and the avoidance control unit 230 performing an avoidance operation by executing avoidance control of automatically controlling one or both of the acceleration/deceleration and the steering of the subject vehicle M with a priority with respect to the automatic driving control in a case in which approach of the subject vehicle M to the detected target within a predetermined range is detected, whereby an unexpected event that may be an obstacle for the advancement of the vehicle can be appropriately avoided.

In addition, in a case in which it is determined that deceleration control using the AEB control is necessary, the avoidance control unit 230 may prioritize the control executed by the avoidance control unit 230 either in a case in which automatic driving control using the automatic driving control device 100 is operated or in a case in which the automatic driving control is not operated.

Second Embodiment

Hereinafter, a second embodiment will be described. In the first embodiment, although the automatic driving control is ended while a notification operation of notifying of execution of the automatic drive stopping control is continued, in the second embodiment, automatic driving control is ended after a notification operation of notifying of execution of automatic drive stopping control ends. Hereinafter, such a point will be described.

Figure 12:
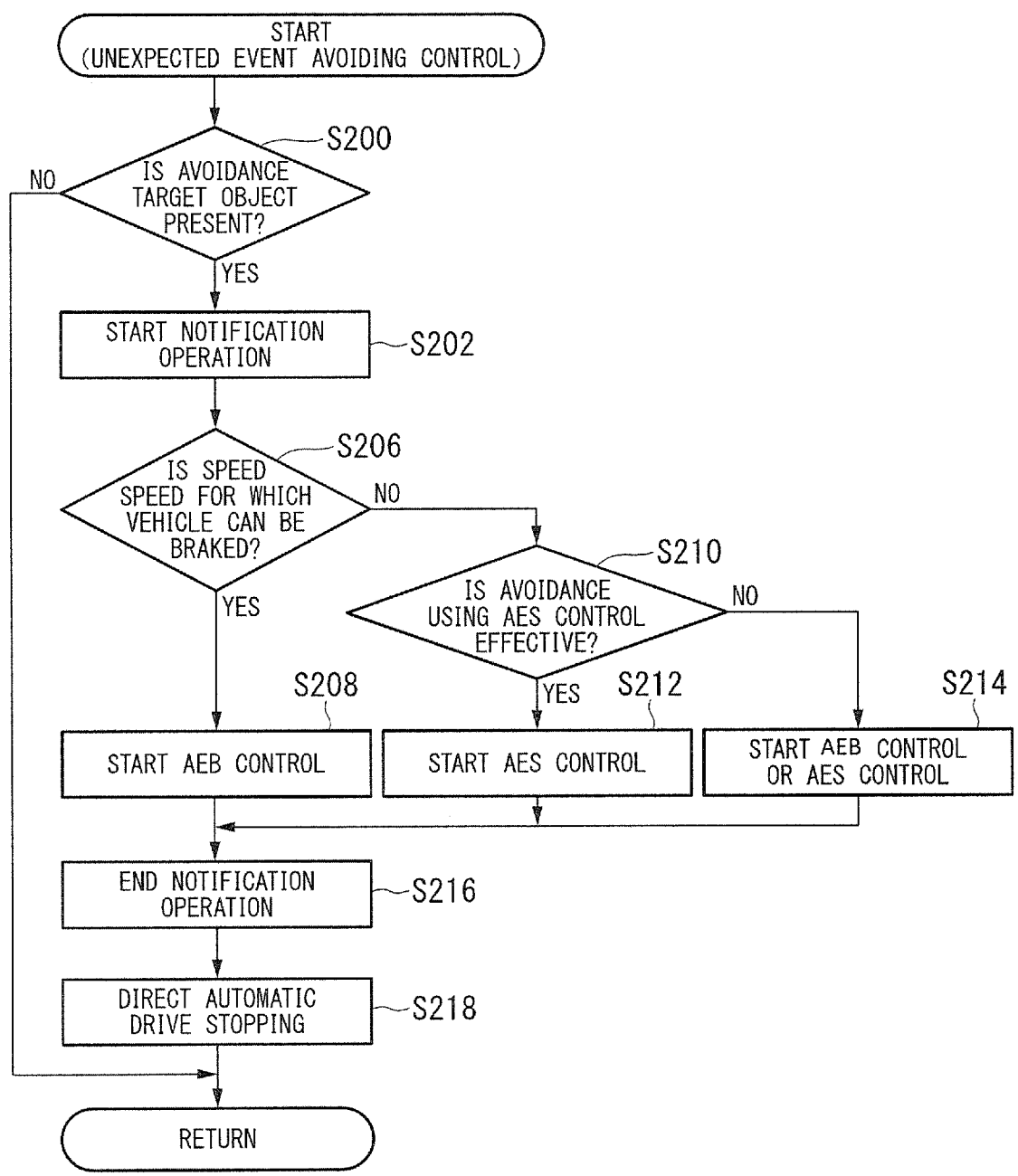
FIG. 12 is a flowchart illustrating the sequence of an unexpected event avoiding process in an unexpected event detecting device according to a second embodiment.

FIG. 12 is a flowchart illustrating the sequence of a process of ending automatic driving control after a pre-execution alarm ends. A vehicle control device 1 according to the second embodiment executes the process illustrated in FIG. 12 instead of the process illustrated in FIG. 9 described above. The same reference sign as that illustrated in FIG. 9 will be assigned to each step in which a process similar to that illustrated in FIG. 12 is performed. Hereinafter, different points will be focused upon in description.

A relative position detecting unit 210 calculates a distance to a target on the basis of information input from sensors such as a radar 30, a camera 40, and the like and detects a relative position of a target with respect to a subject vehicle M. An avoidance control unit 230 calculates a speed for the target on the basis of a result of detection using the relative position detecting unit 210. The avoidance control unit 230 determines whether or not an avoidance target object that is a target is present (S200), and, in a case in which the avoidance target object is not present, ends a series of processes.

On the other hand, in a case in which an avoidance target object is present, the avoidance control unit 230 starts a notification operation of notifying of execution of automatic drive stopping control by controlling a pre-operation alarm device 96 and continues the notification operation (S202).

Next, the avoidance control unit 230 determines whether or not a speed for the target is a speed at which the subject vehicle M can be appropriately braked through deceleration control (S206).

Next, in a case in which the speed for the target is determined as being a speed at which the subject vehicle M can be appropriately braked through deceleration control, the avoidance control unit 230 starts AEB control (S208). The avoidance control unit 230 continuously performs the process of S210.

Next, in a case in which the speed for the target is determined as not being a speed at which the subject vehicle M can be appropriately braked through deceleration control, the avoidance control unit 230 determines whether or not the target can be avoided using AES control (S210).

Next, in a case in which it is determined that the target can be avoided using the AES control, the avoidance control unit 230 starts the AES control (S212). The avoidance control unit 230 continuously performs the process of S210.

On the other hand, in a case in which avoidance using the AES control cannot be achieved, in other words, in a case in which it is determined that avoidance using the AEB control and avoidance using the AES control cannot be achieved, the avoidance control unit 230 operates one or both of the avoidance using the AEB control and the avoidance using the AES control (S214).

Next, after a process of avoiding approach to the target is ended by performing the process of S208, S212, or S214, the avoidance control unit 230 ends the notification operation of notifying of execution of the automatic drive stopping control by controlling the pre-operation alarm device 96 (S216).

Next, the avoidance control unit 230 directs automatic drive stopping for the automatic driving control device 100 and stops the automatic driving (S218). For example, the after the direction of the automatic drive stopping is received, the automatic driving control device 100 stops the automatic driving control in a speedy manner. In other words, in order for the avoidance control unit 230 to execute a process with a priority, the avoidance control unit 230 stops the automatic driving control using the automatic driving control device 100 and prevents the automatic driving control and the unexpected event avoiding control from interfering with each other. In addition, in a case in which the control described above is received while the pre-operation alarm device 96 outputs a pre-operation warning of the automatic drive stopping control, the automatic driving control device 100 ends the automatic driving control.

According to the second embodiment described above, similar to the first embodiment, an unexpected event that may be an obstacle for the advancement of the vehicle can be appropriately avoided. In addition, the automatic driving control device 100 ends the automatic driving control after the pre-execution alarm of the automatic drive stopping control ends, and accordingly, the vehicle control device 1 can end the automatic driving control after the output of the pre-execution alarm of the automatic drive stopping control ends.

Third Embodiment

Hereinafter, a third embodiment will be described. In the first embodiment, although the automatic driving control is stopped by avoiding an unexpected event, according to the third embodiment, automatic driving control is restarted after the process of avoiding an unexpected event is performed.

[Process of Restarting Automatic Driving After Avoidance of Unexpected Event]

Figure 13:
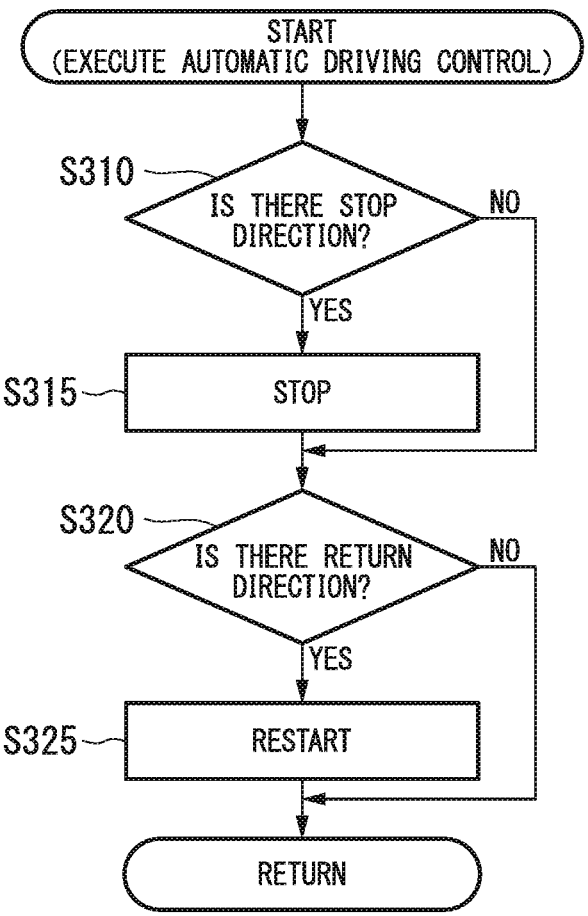
FIG. 13 is a flowchart illustrating the sequence of automatic driving control using an automatic driving control device 100 according to a third embodiment.

FIG. 13 is a flowchart illustrating the sequence of automatic driving control using an automatic driving control device 100 according to the third embodiment.

The automatic driving control device 100 determines whether or not a direction for stopping automatic driving control has been received from an unexpected event avoiding control device 200 (S310). In a case in which the direction for stopping automatic driving control has not been received, the automatic driving control device 100 continues the execution state of the automatic driving control. On the other hand, in a case in which the direction for stopping the automatic driving control has been received, the automatic driving control is stopped (S315).

The automatic driving control device 100 determines whether or not a direction for returning to the automatic driving control has been received from the unexpected event avoiding control device 200 (S320). In a case in which the direction for returning to the automatic driving control has not been received, the stop state of the automatic driving control is continued. On the other hand, in a case in which the direction for returning to the automatic driving control has been received, the automatic driving control is restarted (S325).

Figure 14:
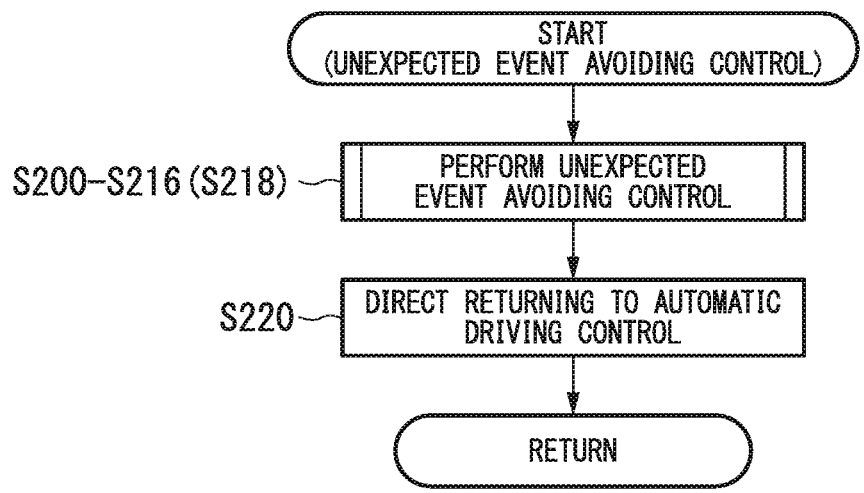
FIG. 14 is a flowchart illustrating the sequence of an automatic drive returning process after unexpected event avoidance using an unexpected event avoiding control device 200 according to the third embodiment.

FIG. 14 is a flowchart illustrating the sequence of an automatic drive returning process after unexpected event avoidance using the unexpected event avoiding control device 200 according to the third embodiment.

In the vehicle control device 1 according to the third embodiment, as illustrated in FIG. 9 or 12, the unexpected event avoiding control device 200 executes the process (S200 to S216 (S218)) of avoiding an unexpected event, and accordingly, the avoidance control unit 230 notifies the automatic driving control device 100 of execution of deceleration control or steering control for avoiding an unexpected event, and the automatic driving control using the automatic driving control device 100 ends.

After releasing or ending the deceleration control or the steering control used for avoiding an unexpected event, the avoidance control unit 230 notifies the automatic driving control device 100 of the release or the end of the deceleration control or the steering control for the automatic driving control device 100 that has ended the automatic driving control (S220).

The automatic driving control device 100 acquires a notification of S220 as a direction for returning the automatic driving control illustrated in FIG. 13 and, for example, starts or restarts the automatic driving control in accordance with the sequence for starting the automatic driving described in the first embodiment described above.

According to the third embodiment described above, similar to the first embodiment, the vehicle control device 1 can appropriately avoid an unexpected event that may be an obstacle for the advancement of the vehicle. In addition, in a case in which the avoidance operation is released or ended by the avoidance control unit 230 after the automatic driving control using the automatic driving control device 100 ends, the vehicle control device 1 restarts the automatic driving control. Accordingly, after the automatic driving control ends, the vehicle control device 1 can restart the automatic driving control from the stop state of the automatic driving.

As above, while the embodiments of the present invention have been described, the present invention is not limited to such embodiments at all, and various modifications and substitutions may be made in a range not departing from the concept of the present invention.

REFERENCE SIGNS LIST

1 Vehicle control device
20 Finder
30 Radar
40 Camera
50 Navigation device
60 Vehicle sensor
62 Display unit
64 Speaker
66 Switching unit
70 Acceleration pedal
71 Accelerator opening degree sensor
72 Brake pedal
73 Brake depression amount sensor
74 Steering wheel
75 Steering angle sensor
80 Changeover switch
90 Running driving force output device
92 Steering device
94 Brake device
96 Pre-operation alarm device (notification unit)
100 Automatic driving control device
110 Automatic driving control unit
112 Subject vehicle position recognizing unit
114 External system recognizing unit
116 Action plan generating unit
118 Locus generating unit
120 Speed generating unit
130 Running control unit
140 Switching control unit
150 Storage unit
200 Unexpected event control device
210 Relative position detecting unit
230 Avoidance control unit
250 Storage unit
M Subject vehicle

What is claim is:
1. A vehicle control device comprising:
an automatic driving control unit configured to perform automatic driving control of automatically controlling both of acceleration/deceleration and steering of a subject vehicle such that the subject vehicle runs along a route to a destination;
an avoidance target object detecting unit configured to detect an avoidance target object that is a target object to be avoided in the vicinity of the subject vehicle; and
an avoidance control unit configured to execute avoidance control of automatically controlling both of the acceleration/deceleration and the steering of the subject vehicle such that the subject vehicle avoids coming into contact with the avoidance target object with a priority with respect to the automatic driving control in a case in which approach of the subject vehicle to the detected avoidance target object within a predetermined range is detected, wherein the automatic driving control unit avoids the avoidance target object by decelerating the subject vehicle in a case in which a distance to the avoidance target object increases based on an increase in a relative speed representing a first reference distance which is set in accordance with a trend in which a rate of change of the distance is increasing based on an increase in the relative speed, or more, and avoids the avoidance target object using steering in a case in which the distance is greater than a second reference distance that is linearly increasing in accordance with an increase in the relative speed, and ends the automatic driving control in a case in which the avoidance control is executed.

2. The vehicle control device according to claim 1, further comprising a notification unit configured to perform a visible, audible, or tactile notification operation for an occupant of the subject vehicle before the avoidance control is executed, wherein the automatic driving control unit ends the automatic driving control while a notification operation using the notification unit is performed or when the notification operation ends.

3. The vehicle control device according to claim 1,
wherein, in a case in which the avoidance control is released or ended after the automatic driving control ends, the automatic driving control unit restarts the automatic driving control.

4. The vehicle control device according to claim 1,
wherein, in a case in which a speed of the subject vehicle for the avoidance target object exceeds a predetermined value, the avoidance control unit controls at least the steering of the subject vehicle with a priority with respect to steering using the automatic driving control unit on the basis of a result of recognition of the vicinity of the subject vehicle.

5. The vehicle control device according to claim 4,
wherein the predetermined value is a lower limit value of the speed for which it is determined that avoidance is achievable by changing an advancement direction using the steering rather than decelerating the subject vehicle.

6. The vehicle control device according to claim 4,
wherein, in a case in which the speed exceeds the predetermined value and the avoidance target object is present at a distance where the subject vehicle avoids coming into contact with the avoidance target object using steering, the avoidance control unit controls at least the steering of the subject vehicle with a priority with respect to the steering using the automatic driving control unit.

7. The vehicle control device according to claim 1,
wherein, in a case in which a distance to the avoidance target object is a distance, for which deceleration is achievable using deceleration of a predetermined value or less, or more, the avoidance control unit determines that avoidance is achievable by decelerating the subject vehicle.

8. The vehicle control device according to claim 7,
wherein the avoidance control unit determines that avoidance is achievable using the steering in a case in which the distance is a distance for which deceleration using a yaw rate of a predetermined value or less is achievable.

9. The vehicle control device according to claim 1,
wherein the avoidance control unit controls the steering of the subject vehicle in a case in which a distance for which avoidance is achievable by decelerating the subject vehicle is longer than a distance for which avoidance is achievable using the steering.

10. A vehicle control method using an in-vehicle computer, the vehicle control method comprising:
performing automatic driving control of automatically controlling one or both of acceleration/deceleration and steering of a subject vehicle such that the subject vehicle runs along a route to a destination;
detecting an avoidance target object that is a target object to be avoided in the vicinity of the subject vehicle and executing avoidance control of automatically controlling one or both of the acceleration/deceleration and the steering of the subject vehicle such that the subject vehicle avoids coming into contact with the avoidance target object with a priority with respect to the automatic driving control in a case in which approach of the subject vehicle to the detected avoidance target object within a predetermined range is detected;
avoiding the avoidance target object by decelerating the subject vehicle in a case in which a distance to the avoidance target object increases based on an increase in a relative speed representing a first reference distance which is set in accordance with a trend in which a rate of change of the distance is increasing based on an increase in the relative speed, or more;
avoiding the avoidance target object using steering in a case in which the distance is greater than a second reference distance that is linearly increasing in accordance with an increase in the relative speed; and
ending the automatic driving control in a case in which the avoidance control is executed.

11. A non-transitory computer-readable recording medium storing a vehicle control program causing an in-vehicle computer to execute:
perform automatic driving control of automatically controlling one or both of acceleration/deceleration and steering of a subject vehicle such that the subject vehicle runs along a route to a destination;
detect an avoidance target object that is a target object to be avoided in the vicinity of the subject vehicle and execute avoidance control of automatically controlling one or both of the acceleration/deceleration and the steering of the subject vehicle such that the subject vehicle avoids coming into contact with the avoidance target object with a priority with respect to the automatic driving control in a case in which approach of the subject vehicle to the detected avoidance target object within a predetermined range is detected;
avoid the avoidance target object by decelerating the subject vehicle in a case in which a distance to the avoidance target object increases based on an increase in a relative speed representing a first reference distance which is set in accordance with a trend in which a rate of change of the distance is increasing based on an increase in the relative speed, or more;
avoid the avoidance target object using steering in a case in which the distance is greater than a second reference distance that is linearly increasing in accordance with an increase in the relative speed; and
end the automatic driving control in a case in which the avoidance control is executed.

* * * * *